(12) United States Patent
Baxter et al.

(10) Patent No.: US 12,459,909 B2
(45) Date of Patent: Nov. 4, 2025

(54) NITROSATION REAGENTS AND METHODS

(71) Applicant: The Regents of the University of California, Oakland, CA (US)

(72) Inventors: Ryan D. Baxter, Merced, CA (US); Jordan Galloway, Merced, CA (US)

(73) Assignee: The Regents of the University of California, Oakland, CA (US)

( * ) Notice: Subject to any disclaimer, the term of this patent is extended or adjusted under 35 U.S.C. 154(b) by 410 days.

(21) Appl. No.: 17/928,519

(22) PCT Filed: Jun. 17, 2021

(86) PCT No.: PCT/US2021/037860
§ 371 (c)(1),
(2) Date: Nov. 29, 2022

(87) PCT Pub. No.: WO2021/257849
PCT Pub. Date: Dec. 23, 2021

(65) Prior Publication Data
US 2023/0242495 A1  Aug. 3, 2023

Related U.S. Application Data

(60) Provisional application No. 63/040,803, filed on Jun. 18, 2020.

(51) Int. Cl.
| | | |
|---|---|---|
| C07D 275/06 | (2006.01) |
| C07B 43/02 | (2006.01) |
| C07C 243/06 | (2006.01) |
| C07D 205/08 | (2006.01) |
| C07D 207/50 | (2006.01) |
| C07D 209/38 | (2006.01) |
| C07D 211/98 | (2006.01) |
| C07D 213/34 | (2006.01) |
| C07D 233/80 | (2006.01) |
| C07D 239/26 | (2006.01) |
| C07D 241/08 | (2006.01) |
| C07D 277/14 | (2006.01) |
| C07D 277/30 | (2006.01) |
| C07D 295/28 | (2006.01) |
| C07D 317/24 | (2006.01) |
| C07D 317/54 | (2006.01) |
| C07D 317/56 | (2006.01) |
| C07D 319/04 | (2006.01) |
| C07D 319/20 | (2006.01) |
| C07D 453/04 | (2006.01) |
| C07D 495/04 | (2006.01) |

(52) U.S. Cl.
CPC .............................. *C07D 275/06* (2013.01)

(58) Field of Classification Search
CPC .. C07D 275/06; C07D 207/50; C07D 295/28; C07D 209/38; C07D 211/98; C07D 213/34; C07D 233/80; C07D 239/26; C07D 241/08; C07D 277/14; C07D 277/30; C07D 317/24; C07D 317/54; C07D 317/56; C07D 319/04; C07D 319/20; C07D 453/04; C07D 495/04; C07C 243/06; C07B 43/02
See application file for complete search history.

(56) References Cited

U.S. PATENT DOCUMENTS

| | | |
|---|---|---|
| 3,985,727 A | 10/1976 | Daniels |
| 2003/0170608 A1 | 9/2003 | Pronin et al. |
| 2013/0040317 A1 | 2/2013 | Radhakrishna et al. |
| 2019/0038578 A1 | 2/2019 | Baron et al. |

FOREIGN PATENT DOCUMENTS

WO   WO 2020/084059   4/2020

OTHER PUBLICATIONS

RN2374242-09-6 (2019) registry database compound.*

* cited by examiner

*Primary Examiner* — Sun Jae Yoo
(74) *Attorney, Agent, or Firm* — Rudy J. Ng; Bozicevic, Field & Francis LLP

(57) ABSTRACT

Provided are compounds that can find use as nitrosation reagents. Provided are nitrosation methods that include reacting a substrate with one of the provided nitrosation reagents and thereby generating a nitrosation product. Provided are kits including a nitrosation reagent. Provided are compositions wherein the nitrosation reagent is enriched in the $^{15}N$ isotope.

20 Claims, 1 Drawing Sheet

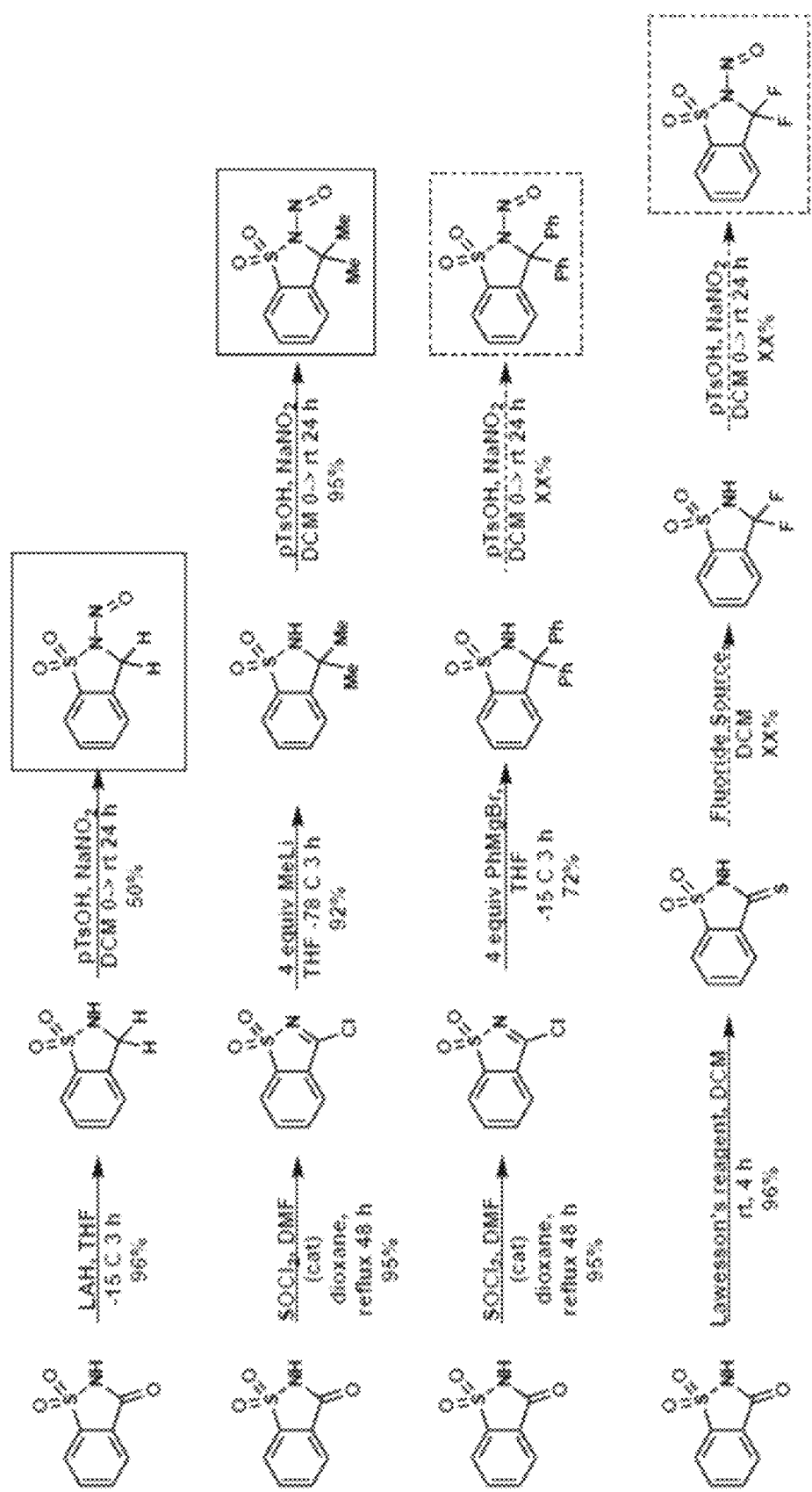

NITROSATION REAGENTS AND METHODS

CROSS-REFERENCE TO RELATED APPLICATIONS

This application is a U.S. National Stage Entry of International Application PCT/US2021/037860, filed Jun. 17, 2021, which claims the benefit of U.S. Provisional Application No. 63/040,803, filed Jun. 18, 2020, the disclosures of which are incorporated herein by reference.

GOVERNMENT RIGHTS

This invention was made with government support under grant number 1752821 awarded by the National Science Foundation. The government has certain rights in the invention.

INTRODUCTION

Nitrosation and nitrosylation are chemical reactions that involve attaching an —NO group to another molecule. The —NO group is sometimes referred to as a nitrosyl group or as a nitroso group. The terms nitrosation and nitrosylation are used interchangeably herein. Common nitrosations include reacting a nitrosation reagent with the X—H bond of a substrate and thereby forming an X—NO group, wherein X is C, S, O, or N.

An existing nitrosation reagent is tert-butyl nitrate (TBN). However, TBN is highly toxic, reactive, and must be stored under cryogenic conditions to avoid decomposition. TBN is not generally effective at performing irreversible nitrosation because the side products are also reactive. TBN also reacts with many functional groups, therefore requiring protecting groups or limiting the substrate scope of TBN.

Nitrosations can also be performed with inorganic reagents, such as sodium nitrite and hydrochloric acid. However, these commonly require very high temperatures and acidic conditions. These conditions are often incompatible with other functional groups on the molecule, again requiring protecting groups or limiting substrate scope.

SUMMARY

Provided are compounds that find use as nitrosation reagents. Provided are nitrosation methods that include reacting a substrate with one of the provided nitrosation reagents and thereby generating a nitrosation product. Provided are kits including a nitrosation reagent. Provided are compositions wherein the nitrosation reagent is enriched in the 15N isotope.

BRIEF DESCRIPTION OF THE DRAWINGS

FIG. 1 shows reaction schemes for the synthesis of four nitrosation reagents, according to embodiments of the present disclosure.

DETAILED DESCRIPTION

Provided are compounds that find use as nitrosation reagents. Provided are nitrosation methods that include reacting a substrate with one of the provided nitrosation reagents and thereby generating a nitrosation product. Provided are kits including a nitrosation reagent. Provided are compositions wherein the nitrosation reagent is enriched in the $^{15}N$ isotope.

Before the present invention is described in greater detail, it is to be understood that this invention is not limited to particular embodiments described, as such may vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and exemplary methods and materials may now be described. Any and all publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" include plural referents unless the context clearly dictates otherwise. Thus, for example, reference to "a droplet" includes a plurality of such droplets and reference to "the discrete entity" includes reference to one or more discrete entities, and so forth.

It is further noted that the claims may be drafted to exclude any element, e.g., any optional element. As such, this statement is intended to serve as antecedent basis for use of such exclusive terminology as "solely", "only" and the like in connection with the recitation of claim elements, or the use of a "negative" limitation.

The publications discussed herein are provided solely for their disclosure prior to the filing date of the present application. Further, the dates of publication provided may be different from the actual publication dates which may need to be independently confirmed. To the extent the definition or usage of any term herein conflicts with a definition or usage of a term in an application or reference incorporated by reference herein, the instant application shall control.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Definitions

The following terms have the following meanings unless otherwise indicated. Any undefined terms have their art recognized meanings.

"Nitrosation" and "nitrosylation" are used interchangeably herein.

"Alkyl" refers to monovalent saturated aliphatic hydrocarbyl groups having from 1 to 10 carbon atoms and preferably 1 to 6 carbon atoms. This term includes, by way of example, linear and branched hydrocarbyl groups such as methyl ($CH_3$—), ethyl($CH_3CH_2$—), n-propyl ($CH_3CH_2CH_2$—), isopropyl (($CH_3)_2CH$—), n-butyl ($CH_3CH_2CH_2CH_2$—), isobutyl (($CH_3)_2CHCH_2$—), sec-butyl (($CH_3)(CH_3CH_2)CH$—), t-butyl (($CH_3)_3C$—), n-pentyl ($CH_3CH_2CH_2CH_2CH_2$—), and neopentyl (($CH_3)_3CCH_2$—).

The term "substituted alkyl" refers to an alkyl group as defined herein wherein one or more carbon atoms in the alkyl chain (except the $C_1$ carbon atom) have been optionally replaced with a heteroatom such as —O—, —N—, —S—, —S(O)$_n$— (where n is 0 to 2), —NR— (where R is hydrogen or alkyl) and having from 1 to 5 substituents selected from the group consisting of alkoxy, substituted alkoxy, cycloalkyl, substituted cycloalkyl, cycloalkenyl, substituted cycloalkenyl, acyl, acylamino, acyloxy, amino, aminoacyl, aminoacyloxy, oxyaminoacyl, azido, cyano, halogen, hydroxyl, oxo, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO-aryl, —SO-heteroaryl, —$SO_2$-alkyl, —$SO_2$-aryl, —$SO_2$-heteroaryl, and —$NR^aR^b$, wherein R' and R" may be the same or different and are chosen from hydrogen, optionally substituted alkyl, cycloalkyl, alkenyl, cycloalkenyl, alkynyl, aryl, heteroaryl and heterocyclic.

"Alkylene" refers to divalent aliphatic hydrocarbyl groups preferably having from 1 to 6 and more preferably 1 to 3 carbon atoms that are either straight-chained or branched, and which are optionally interrupted with one or more groups selected from —O—, —$NR^{10}$—, —$NR^{10}C(O)$—, —$C(O)NR^{10}$— and the like. This term includes, by way of example, methylene (—$CH_2$—), ethylene (—$CH_2CH_2$—), n-propylene (—$CH_2CH_2CH_2$—), iso-propylene (—$CH_2CH(CH_3)$—), (—$C(CH_3)_2CH_2CH_2$—), (—$C(CH_3)_2CH_2C(O)$—), (—$C(CH_3)_2CH_2C(O)NH$—), (—$CH(CH_3)CH_2$—), and the like.

"Substituted alkylene" refers to an alkylene group having from 1 to 3 hydrogens replaced with substituents as described for carbons in the definition of "substituted" below.

The term "alkane" refers to alkyl group and alkylene group, as defined herein.

The term "alkylaminoalkyl", "alkylaminoalkenyl" and "alkylaminoalkynyl" refers to the groups R'NHR"— where R' is alkyl group as defined herein and R" is alkylene, alkenylene or alkynylene group as defined herein.

The term "alkaryl" or "aralkyl" refers to the groups-alkylene-aryl and -substituted alkylene-aryl where alkylene, substituted alkylene and aryl are defined herein.

"Alkoxy" refers to the group-O-alkyl, wherein alkyl is as defined herein. Alkoxy includes, by way of example, methoxy, ethoxy, n-propoxy, isopropoxy, n-butoxy, t-butoxy, sec-butoxy, n-pentoxy, and the like. The term "alkoxy" also refers to the groups alkenyl-O—, cycloalkyl-O—, cycloalkenyl-O—, and alkynyl-O—, where alkenyl, cycloalkyl, cycloalkenyl, and alkynyl are as defined herein.

The term "substituted alkoxy" refers to the groups substituted alkyl-O—, substituted alkenyl-O—, substituted cycloalkyl-O—, substituted cycloalkenyl-O—, and substituted alkynyl-O— where substituted alkyl, substituted alkenyl, substituted cycloalkyl, substituted cycloalkenyl and substituted alkynyl are as defined herein.

The term "alkoxyamino" refers to the group-NH-alkoxy, wherein alkoxy is defined herein.

The term "haloalkoxy" refers to the groups alkyl-O— wherein one or more hydrogen atoms on the alkyl group have been substituted with a halo group and include, by way of examples, groups such as trifluoromethoxy, and the like.

The term "haloalkyl" refers to a substituted alkyl group as described above, wherein one or more hydrogen atoms on the alkyl group have been substituted with a halo group. Examples of such groups include, without limitation, fluoroalkyl groups, such as trifluoromethyl, difluoromethyl, trifluoroethyl and the like.

The term "alkylalkoxy" refers to the groups-alkylene-O-alkyl, alkylene-O-substituted alkyl, substituted alkylene-O-alkyl, and substituted alkylene-O-substituted alkyl wherein alkyl, substituted alkyl, alkylene and substituted alkylene are as defined herein.

The term "alkylthioalkoxy" refers to the group-alkylene-S-alkyl, alkylene-S-substituted alkyl, substituted alkylene-S-alkyl and substituted alkylene-S-substituted alkyl wherein alkyl, substituted alkyl, alkylene and substituted alkylene are as defined herein.

"Alkenyl" refers to straight chain or branched hydrocarbyl groups having from 2 to 6 carbon atoms and preferably 2 to 4 carbon atoms and having at least 1 and preferably from 1 to 2 sites of double bond unsaturation. This term includes, by way of example, bi-vinyl, allyl, and but-3-en-1-yl. Included within this term are the cis and trans isomers or mixtures of these isomers.

The term "substituted alkenyl" refers to an alkenyl group as defined herein having from 1 to 5 substituents, or from 1 to 3 substituents, selected from alkoxy, substituted alkoxy, cycloalkyl, substituted cycloalkyl, cycloalkenyl, substituted cycloalkenyl, acyl, acylamino, acyloxy, amino, substituted amino, aminoacyl, aminoacyloxy, oxyaminoacyl, azido, cyano, halogen, hydroxyl, oxo, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO-substituted alkyl, —SO-aryl, —SO-heteroaryl, —$SO_2$-alkyl, —$SO_2$-substituted alkyl, —$SO_2$-aryl and —$SO_2$-heteroaryl.

"Alkynyl" refers to straight or branched monovalent hydrocarbyl groups having from 2 to 6 carbon atoms and preferably 2 to 3 carbon atoms and having at least 1 and preferably from 1 to 2 sites of triple bond unsaturation. Examples of such alkynyl groups include acetylenyl (—C≡CH), and propargyl (—$CH_2$C≡CH).

The term "substituted alkynyl" refers to an alkynyl group as defined herein having from 1 to 5 substituents, or from 1 to 3 substituents, selected from alkoxy, substituted alkoxy, cycloalkyl, substituted cycloalkyl, cycloalkenyl, substituted cycloalkenyl, acyl, acylamino, acyloxy, amino, substituted amino, aminoacyl, aminoacyloxy, oxyaminoacyl, azido, cyano, halogen, hydroxyl, oxo, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO-substituted alkyl, —SO-aryl, —SO-heteroaryl, —$SO_2$-alkyl, —$SO_2$-substituted alkyl, —$SO_2$-aryl, and —$SO_2$-heteroaryl.

"Alkynyloxy" refers to the group-O-alkynyl, wherein alkynyl is as defined herein. Alkynyloxy includes, by way of example, ethynyloxy, propynyloxy, and the like.

"Acyl" refers to the groups H—C(O)—, alkyl-C(O)—, substituted alkyl-C(O)—, alkenyl-C(O)—, substituted alkenyl-C(O)—, alkynyl-C(O)—, substituted alkynyl-C(O)—, cycloalkyl-C(O)—, substituted cycloalkyl-C(O)—, cycloalkenyl-C(O)—, substituted cycloalkenyl-C(O)—, aryl-C(O)—, substituted aryl-C(O)—, heteroaryl-C(O)—, substituted heteroaryl-C(O)—, heterocyclyl-C(O)—, and substituted heterocyclyl-C(O)—, wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic, and substituted heterocyclic are as defined herein. For example, acyl includes the "acetyl" group $CH_3C(O)$—

"Acylamino" refers to the groups —$NR^{20}C(O)$alkyl, —$NR^{20}C(O)$ substituted alkyl, $NR^{20}C(O)$cycloalkyl, —$NR^{20}C(O)$ substituted cycloalkyl, —$NR^{20}C(O)$cycloalkenyl, —$NR^{20}C(O)$ substituted cycloalkenyl, —$NR^{20}C(O)$ alkenyl, —$NR^{20}C(O)$ substituted alkenyl, —$NR^{20}C(O)$ alkynyl, —$NR^{20}C(O)$ substituted alkynyl, —$NR^{20}C(O)$ aryl, —$NR^{20}C(O)$ substituted aryl, —$NR^{20}C(O)$ heteroaryl, —$NR^{20}C(O)$ substituted heteroaryl, —$NR^{20}C(O)$ heterocyclic, and —$NR^{20}C(O)$ substituted heterocyclic, wherein $R^{20}$ is hydrogen or alkyl and wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic, and substituted heterocyclic are as defined herein.

"Aminocarbonyl" or the term "aminoacyl" refers to the group —$C(O)NR^{21}R^{22}$, wherein $R^{21}$ and $R^{22}$ independently are selected from the group consisting of hydrogen, alkyl, substituted alkyl, alkenyl, substituted alkenyl, alkynyl, substituted alkynyl, aryl, substituted aryl, cycloalkyl, substituted cycloalkyl, cycloalkenyl, substituted cycloalkenyl, heteroaryl, substituted heteroaryl, heterocyclic, and substituted heterocyclic and where $R^{21}$ and $R^{22}$ are optionally joined together with the nitrogen bound thereto to form a heterocyclic or substituted heterocyclic group, and wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic, and substituted heterocyclic are as defined herein.

"Aminocarbonylamino" refers to the group —$NR^{21}C(O)NR^{22}R^{23}$ where $R^{21}$, $R^{22}$, and $R^{23}$ are independently selected from hydrogen, alkyl, aryl or cycloalkyl, or where two R groups are joined to form a heterocyclyl group.

The term "alkoxycarbonylamino" refers to the group —NRC(O)OR where each R is independently hydrogen, alkyl, substituted alkyl, aryl, heteroaryl, or heterocyclyl wherein alkyl, substituted alkyl, aryl, heteroaryl, and heterocyclyl are as defined herein.

The term "acyloxy" refers to the groups alkyl-C(O)O—, substituted alkyl-C(O)O—, cycloalkyl-C(O)O—, substituted cycloalkyl-C(O)O—, aryl-C(O)O—, heteroaryl-C(O)O—, and heterocyclyl-C(O)O— wherein alkyl, substituted alkyl, cycloalkyl, substituted cycloalkyl, aryl, heteroaryl, and heterocyclyl are as defined herein.

"Aminosulfonyl" refers to the group —$SO_2NR^{21}R^{22}$, wherein $R^{21}$ and $R^{22}$ independently are selected from the group consisting of hydrogen, alkyl, substituted alkyl, alkenyl, substituted alkenyl, alkynyl, substituted alkynyl, aryl, substituted aryl, cycloalkyl, substituted cycloalkyl, cycloalkenyl, substituted cycloalkenyl, heteroaryl, substituted heteroaryl, heterocyclic, substituted heterocyclic and where $R^{21}$ and $R^{22}$ are optionally joined together with the nitrogen bound thereto to form a heterocyclic or substituted heterocyclic group and alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic and substituted heterocyclic are as defined herein.

"Sulfonylamino" refers to the group —$NR^{21}SO_2R^{22}$, wherein $R^{21}$ and $R^{22}$ independently are selected from the group consisting of hydrogen, alkyl, substituted alkyl, alkenyl, substituted alkenyl, alkynyl, substituted alkynyl, aryl, substituted aryl, cycloalkyl, substituted cycloalkyl, cycloalkenyl, substituted cycloalkenyl, heteroaryl, substituted heteroaryl, heterocyclic, and substituted heterocyclic and where $R^{21}$ and $R^{22}$ are optionally joined together with the atoms bound thereto to form a heterocyclic or substituted heterocyclic group, and wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic, and substituted heterocyclic are as defined herein.

"Aryl" or "Ar" refers to a monovalent aromatic carbocyclic group of from 6 to 18 carbon atoms having a single ring (such as is present in a phenyl group) or a ring system having multiple condensed rings (examples of such aromatic ring systems include naphthyl, anthryl and indanyl) which condensed rings may or may not be aromatic, provided that the point of attachment is through an atom of an aromatic ring. This term includes, by way of example, phenyl and naphthyl. Unless otherwise constrained by the definition for the aryl substituent, such aryl groups can optionally be substituted with from 1 to 5 substituents, or from 1 to 3 substituents, selected from acyloxy, hydroxy, thiol, acyl, alkyl, alkoxy, alkenyl, alkynyl, cycloalkyl, cycloalkenyl, substituted alkyl, substituted alkoxy, substituted alkenyl, substituted alkynyl, substituted cycloalkyl, substituted cycloalkenyl, amino, substituted amino, aminoacyl, acylamino, alkaryl, aryl, aryloxy, azido, carboxyl, carboxylalkyl, cyano, halogen, nitro, heteroaryl, heteroaryloxy, heterocyclyl, heterocyclooxy, aminoacyloxy, oxyacylamino, thioalkoxy, substituted thioalkoxy, thioaryloxy, thioheteroaryloxy, —SO-alkyl, —SO-substituted alkyl, —SO-aryl, —SO-heteroaryl, —$SO_2$-alkyl, —$SO_2$-substituted alkyl, —$SO_2$-aryl, —$SO_2$-heteroaryl and trihalomethyl.

"Aryloxy" refers to the group-O-aryl, wherein aryl is as defined herein, including, by way of example, phenoxy, naphthoxy, and the like, including optionally substituted aryl groups as also defined herein.

"Amino" refers to the group —$NH_2$.

The term "substituted amino" refers to the group —NRR where each R is independently selected from the group consisting of hydrogen, alkyl, substituted alkyl, cycloalkyl, substituted cycloalkyl, alkenyl, substituted alkenyl, cycloalkenyl, substituted cycloalkenyl, alkynyl, substituted alkynyl, aryl, heteroaryl, and heterocyclyl provided that at least one R is not hydrogen.

The term "azido" refers to the group —$N_3$.

"Carboxyl," "carboxy" or "carboxylate" refers to —$CO_2H$ or salts thereof.

"Carboxyl ester" or "carboxy ester" or the terms "carboxyalkyl" or "carboxylalkyl" refers to the groups-C(O)O-alkyl, —C(O)O-substituted alkyl, —C(O)O-alkenyl, —C(O)O-substituted alkenyl, —C(O)O-alkynyl, —C(O)O-substituted alkynyl, —C(O)O-aryl, —C(O)O-substituted aryl, —C(O)O-cycloalkyl, —C(O)O-substituted cycloalkyl, —C(O)O-cycloalkenyl, —C(O)O-substituted cycloalkenyl, —C(O)O-heteroaryl, —C(O)O-substituted heteroaryl, —C(O)O-heterocyclic, and —C(O)O-substituted heterocyclic, wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic, and substituted heterocyclic are as defined herein.

"(Carboxyl ester)oxy" or "carbonate" refers to the groups-O—C(O)O— alkyl, —O—C(O)O-substituted alkyl, —O—C(O)O-alkenyl, —O—C(O)O-substituted alkenyl, —O—C(O)O-alkynyl, —O—C(O)O-substituted alkynyl, —O—C(O)O-aryl, —O—C(O)O-substituted aryl, —O—C(O)O-cycloalkyl, —O—C(O)O-substituted cycloalkyl, —O—C(O)O-cycloalkenyl, —O—C(O)O— substituted cycloalkenyl, —O—C(O)O-heteroaryl, —O—C(O)O-substituted heteroaryl, —O—C(O)O-heterocyclic, and —O—C(O)O-substituted heterocyclic, wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic, and substituted heterocyclic are as defined herein.

"Cyano" or "nitrile" refers to the group-CN.

"Cycloalkyl" refers to cyclic alkyl groups of from 3 to 10 carbon atoms having single or multiple cyclic rings including fused, bridged, and spiro ring systems. Examples of suitable cycloalkyl groups include, for instance, adamantyl, cyclopropyl, cyclobutyl, cyclopentyl, cyclooctyl and the like. Such cycloalkyl groups include, by way of example, single ring structures such as cyclopropyl, cyclobutyl, cyclopentyl, cyclooctyl, and the like, or multiple ring structures such as adamantanyl, and the like.

The term "substituted cycloalkyl" refers to cycloalkyl groups having from 1 to 5 substituents, or from 1 to 3 substituents, selected from alkyl, substituted alkyl, alkoxy, substituted alkoxy, cycloalkyl, substituted cycloalkyl, cycloalkenyl, substituted cycloalkenyl, acyl, acylamino, acyloxy, amino, substituted amino, aminoacyl, aminoacyloxy, oxyaminoacyl, azido, cyano, halogen, hydroxyl, oxo, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO-substituted alkyl, —SO-aryl, —SO-heteroaryl, —SO$_2$-alkyl, —SO$_2$-substituted alkyl, —SO$_2$-aryl and —SO$_2$-heteroaryl.

"Cycloalkenyl" refers to non-aromatic cyclic alkyl groups of from 3 to 10 carbon atoms having single or multiple rings and having at least one double bond and preferably from 1 to 2 double bonds.

The term "substituted cycloalkenyl" refers to cycloalkenyl groups having from 1 to 5 substituents, or from 1 to 3 substituents, selected from alkoxy, substituted alkoxy, cycloalkyl, substituted cycloalkyl, cycloalkenyl, substituted cycloalkenyl, acyl, acylamino, acyloxy, amino, substituted amino, aminoacyl, aminoacyloxy, oxyaminoacyl, azido, cyano, halogen, hydroxyl, keto, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO-substituted alkyl, —SO-aryl, —SO-heteroaryl, —SO$_2$-alkyl, —SO$_2$-substituted alkyl, —SO$_2$-aryl and —SO$_2$-heteroaryl.

"Cycloalkynyl" refers to non-aromatic cycloalkyl groups of from 5 to 10 carbon atoms having single or multiple rings and having at least one triple bond.

"Cycloalkoxy" refers to—O-cycloalkyl.

"Cycloalkenyloxy" refers to—O-cycloalkenyl.

"Halo" or "halogen" refers to fluoro, chloro, bromo, and iodo.

"Hydroxy" or "hydroxyl" refers to the group-OH.

"Heteroaryl" refers to an aromatic group of from 1 to 15 carbon atoms, such as from 1 to 10 carbon atoms and 1 to 10 heteroatoms selected from the group consisting of oxygen, nitrogen, and sulfur within the ring. Such heteroaryl groups can have a single ring (such as, pyridinyl, imidazolyl or furyl) or multiple condensed rings in a ring system (for example as in groups such as, indolizinyl, quinolinyl, benzofuran, benzimidazolyl or benzothienyl), wherein at least one ring within the ring system is aromatic and at least one ring within the ring system is aromatic, provided that the point of attachment is through an atom of an aromatic ring. In certain embodiments, the nitrogen and/or sulfur ring atom(s) of the heteroaryl group are optionally oxidized to provide for the N-oxide (N→O), sulfinyl, or sulfonyl moieties. This term includes, by way of example, pyridinyl, pyrrolyl, indolyl, thiophenyl, and furanyl. Unless otherwise constrained by the definition for the heteroaryl substituent, such heteroaryl groups can be optionally substituted with 1 to 5 substituents, or from 1 to 3 substituents, selected from acyloxy, hydroxy, thiol, acyl, alkyl, alkoxy, alkenyl, alkynyl, cycloalkyl, cycloalkenyl, substituted alkyl, substituted alkoxy, substituted alkenyl, substituted alkynyl, substituted cycloalkyl, substituted cycloalkenyl, amino, substituted amino, aminoacyl, acylamino, alkaryl, aryl, aryloxy, azido, carboxyl, carboxylalkyl, cyano, halogen, nitro, heteroaryl, heteroaryloxy, heterocyclyl, heterocyclooxy, aminoacyloxy, oxyacylamino, thioalkoxy, substituted thioalkoxy, thioaryloxy, thioheteroaryloxy, —SO-alkyl, —SO-substituted alkyl, —SO-aryl, —SO-heteroaryl, —SO$_2$-alkyl, —SO$_2$-substituted alkyl, —SO$_2$-aryl and —SO$_2$-heteroaryl, and trihalomethyl.

The term "heteroaralkyl" refers to the groups-alkylene-heteroaryl where alkylene and heteroaryl are defined herein. This term includes, by way of example, pyridylmethyl, pyridylethyl, indolylmethyl, and the like.

"Heteroaryloxy" refers to—O-heteroaryl.

"Heterocycle," "heterocyclic," "heterocycloalkyl," and "heterocyclyl" refer to a saturated or unsaturated group having a single ring or multiple condensed rings, including fused bridged and spiro ring systems, and having from 3 to 20 ring atoms, including 1 to 10 hetero atoms. These ring atoms are selected from the group consisting of nitrogen, sulfur, or oxygen, wherein, in fused ring systems, one or more of the rings can be cycloalkyl, aryl, or heteroaryl, provided that the point of attachment is through the non-aromatic ring. In certain embodiments, the nitrogen and/or sulfur atom(s) of the heterocyclic group are optionally oxidized to provide for the N-oxide, —S(O)—, or —SO$_2$-moieties.

Examples of heterocycles and heteroaryls include, but are not limited to, azetidine, pyrrole, imidazole, pyrazole, pyridine, pyrazine, pyrimidine, pyridazine, indolizine, isoindole, indole, dihydroindole, indazole, purine, quinolizine, isoquinoline, quinoline, phthalazine, naphthylpyridine, quinoxaline, quinazoline, cinnoline, pteridine, carbazole, carboline, phenanthridine, acridine, phenanthroline, isothiazole, phenazine, isoxazole, phenoxazine, phenothiazine, imidazolidine, imidazoline, piperidine, piperazine, indoline, phthalimide, 1,2,3,4-tetrahydroisoquinoline, 4,5,6,7-tetrahydrobenzo[b]thiophene, thiazole, thiazolidine, thiophene, benzo[b]thiophene, morpholinyl, thiomorpholinyl (also referred to as thiamorpholinyl), 1,1-dioxothiomorpholinyl, piperidinyl, pyrrolidine, tetrahydrofuranyl, and the like.

Unless otherwise constrained by the definition for the heterocyclic substituent, such heterocyclic groups can be optionally substituted with 1 to 5, or from 1 to 3 substituents, selected from alkoxy, substituted alkoxy, cycloalkyl, substituted cycloalkyl, cycloalkenyl, substituted cycloalkenyl, acyl, acylamino, acyloxy, amino, substituted amino, aminoacyl, aminoacyloxy, oxyaminoacyl, azido, cyano, halogen, hydroxyl, oxo, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO-substituted alkyl, —SO-aryl, —SO-heteroaryl, —SO$_2$-alkyl, —SO$_2$-substituted alkyl, —SO$_2$-aryl, —SO$_2$-heteroaryl, and fused heterocycle.

"Heterocyclyloxy" refers to the group-O-heterocyclyl.

The term "heterocyclylthio" refers to the group heterocyclic-S—.

The term "heterocyclene" refers to the diradical group formed from a heterocycle, as defined herein.

The term "hydroxyamino" refers to the group —NHOH.

"Nitro" refers to the group —NO$_2$.

"Oxo" refers to the atom (=O).

"Sulfonyl" refers to the group SO$_2$-alkyl, SO$_2$-substituted alkyl, SO$_2$-alkenyl, SO$_2$-substituted alkenyl, SO$_2$-cycloalkyl, SO$_2$-substituted cycloalkyl, SO$_2$-cycloalkenyl, SO$_2$-substituted cylcoalkenyl, SO$_2$-aryl, SO$_2$-substituted aryl, SO$_2$-heteroaryl, SO$_2$-substituted heteroaryl, SO$_2$-heterocyclic, and SO$_2$-substituted heterocyclic, wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic, and substituted heterocyclic are as defined herein. Sulfonyl includes, by way of example, methyl-SO$_2$—, phenyl-SO$_2$—, and 4-methylphenyl-SO$_2$—.

"Sulfonyloxy" refers to the group-OSO$_2$-alkyl, OSO$_2$-substituted alkyl, OSO$_2$-alkenyl, OSO$_2$-substituted alkenyl, OSO$_2$-cycloalkyl, OSO$_2$-substituted cycloalkyl, OSO$_2$-cycloalkenyl, OSO$_2$-substituted cylcoalkenyl, OSO$_2$-aryl, OSO$_2$-substituted aryl, OSO$_2$-heteroaryl, OSO$_2$-substituted heteroaryl, OSO$_2$-heterocyclic, and OSO$_2$ substituted heterocyclic, wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic, and substituted heterocyclic are as defined herein.

The term "aminocarbonyloxy" refers to the group —OC(O)NRR where each R is independently hydrogen, alkyl, substituted alkyl, aryl, heteroaryl, or heterocyclic wherein alkyl, substituted alkyl, aryl, heteroaryl and heterocyclic are as defined herein.

"Thiol" refers to the group —SH.

"Thioxo" or the term "thioketo" refers to the atom (=S).

"Alkylthio" or the term "thioalkoxy" refers to the group —S-alkyl, wherein alkyl is as defined herein. In certain embodiments, sulfur may be oxidized to —S(O)—. The sulfoxide may exist as one or more stereoisomers.

The term "substituted thioalkoxy" refers to the group —S-substituted alkyl.

The term "thioaryloxy" refers to the group aryl-S— wherein the aryl group is as defined herein including optionally substituted aryl groups also defined herein.

The term "thioheteroaryloxy" refers to the group heteroaryl-S— wherein the heteroaryl group is as defined herein including optionally substituted aryl groups as also defined herein.

The term "thioheterocyclooxy" refers to the group heterocyclyl-S— wherein the heterocyclyl group is as defined herein including optionally substituted heterocyclyl groups as also defined herein.

In addition to the disclosure herein, the term "substituted," when used to modify a specified group or radical, can also mean that one or more hydrogen atoms of the specified group or radical are each, independently of one another, replaced with the same or different substituent groups as defined below.

In addition to the groups disclosed with respect to the individual terms herein, substituent groups for substituting for one or more hydrogens (any two hydrogens on a single carbon can be replaced with =O, =NR$^{70}$, =N—OR$^{70}$, =N$_2$ or =S) on saturated carbon atoms in the specified group or radical are, unless otherwise specified, —R$^{60}$, halo, =O, —OR$^{70}$, —SR$^{70}$, —NR$^{80}$R$^{80}$, trihalomethyl, —CN, —OCN, —SCN, —NO, —NO$_2$, =N$_2$, —N$_3$, —SO$_2$R$^{70}$, —SO$_2$O$^-$M$^+$, —SO$_2$OR$^{70}$, —OSO$_2$R$^{70}$, —OSO$_2$O$^-$M$^+$, —OSO$_2$OR$^{70}$, —P(O)(O$^-$)$_2$(M$^+$)$_2$, —P(O)(OR$^{70}$)O$^-$M$^+$, —P(O)(OR$^{70}$)$_2$, —C(O)R$^{70}$, —C(S)R$^{70}$, —C(NR$^{70}$)R$^{70}$, —C(O)O$^-$M$^+$, —C(O)OR$^{70}$, —C(S)OR$^{70}$, —C(O)NR$^{80}$R$^{80}$, —C(NR$^{70}$)NR$^{80}$R$^{80}$, —OC(O)R$^{70}$, —OC(S)R$^{70}$, —OC(O) O$^-$M$^+$, —OC(O)OR$^{70}$, —OC(S)OR$^{70}$, —NR$^{70}$C(O)R$^{70}$, —NR$^{70}$C(S)R$^{70}$, —NR$^{70}$CO$_2^-$M$^+$, —NR$^{70}$CO$_2$R$^{70}$, —NR$^{70}$C(S)OR$^{70}$, —NR$^{70}$C(O)NR$^{80}$R$^{80}$, —NR$^{70}$C(NR$^{70}$) R$^{70}$ an d-NR$^{70}$C(NR$^{70}$)NR$^{80}$R$^{80}$, where R$^{60}$ is selected from the group consisting of optionally substituted alkyl, cycloalkyl, heteroalkyl, heterocycloalkylalkyl, cycloalkylalkyl, aryl, arylalkyl, heteroaryl and heteroarylalkyl, each R$^{70}$ is independently hydrogen or R$^{60}$; each R$^{80}$ is independently R$^{70}$ or alternatively, two R$^{80}$'s, taken together with the nitrogen atom to which they are bonded, form a 5-, 6- or 7-membered heterocycloalkyl which may optionally include from 1 to 4 of the same or different additional heteroatoms selected from the group consisting of O, N and S, of which N may have —H or C$_1$-C$_3$ alkyl substitution; and each M$^+$ is a counter ion with a net single positive charge. Each M$^+$ may independently be, for example, an alkali ion, such as K$^+$, Na$^+$, Li$^+$; an ammonium ion, such as $^+$N(R$^{60}$)$_4$; or an alkaline earth ion, such as [Ca$^{2+}$]$_{0.5}$, [Mg$^{2+}$]$_{0.5}$, or [Ba$^{2+}$]$_{0.5}$ (subscript 0.5 means that one of the counter ions for such divalent alkali earth ions can be an ionized form of a compound of the invention and the other a typical counter ion such as chloride, or two ionized compounds disclosed herein can serve as counter ions for such divalent alkali earth ions, or a doubly ionized compound of the invention can serve as the counter ion for such divalent alkali earth ions). As specific examples, —NR$^{80}$R$^{80}$ is meant to include —NH$_2$, —NH-alkyl, N-pyrrolidinyl, N-piperazinyl, 4N-methyl-piperazin-1-yl and N-morpholinyl.

In addition to the disclosure herein, substituent groups for hydrogens on unsaturated carbon atoms in "substituted" alkene, alkyne, aryl and heteroaryl groups are, unless otherwise specified, —R$^{60}$, halo, —O$^-$M$^+$, —OR$^{70}$, —SR$^{70}$, —S$^-$M$^+$, —NR$^{80}$R$^{80}$, trihalomethyl, —CF$_3$, —CN, —OCN, —SCN, —NO, —NO$_2$, —N$_3$, —SO$_2$R$^{70}$, —SO$_3^-$M$^+$, —SO$_3$R$^{70}$, —OSO$_2$R$^{70}$, —OSO$_3^-$M$^+$, —OSO$_3$R$^{70}$, —PO$_3^{-2}$ (M$^+$)$_2$, —P(O)(OR$^{70}$)O$^-$M$^+$, —P(O)(OR$^{70}$)$_2$, —C(O)R$^{70}$, —C(S)R$^{70}$, —C(NR$^{70}$) R$^{70}$, —CO$_2^-$M$^+$, —CO$_2$R$^{70}$, —C(S)OR$^{70}$, —C(O)NR$^{80}$R$^{80}$, —C(NR$^{70}$)NR$^{80}$R$^{80}$, —OC(O)R$^{70}$, —OC(S)R$^{70}$, —OCO$_2^-$M$^+$, —OCO$_2$R$^{70}$, —OC(S)OR$^{70}$, —NR$^{70}$C(O)R$^{70}$, —NR$^{70}$C(S) R$^{70}$, —NR$^{70}$CO$_2^-$M$^+$, —NR$^{70}$CO$_2$R$^{70}$, —NR$^{70}$C(S)OR$^{70}$, —NR$^{70}$C(O)NR$^{80}$R$^{80}$, —NR$^{70}$C(NR$^{70}$) R$^{70}$ and —NR$^{70}$C(NR$^{70}$)NR$^{80}$R$^{80}$, where R$^{60}$, R$^{70}$, R$^{80}$ and M$^+$ are as previously defined, provided that in case of substituted alkene or alkyne, the substituents are not —O⁻M⁺, —OR⁷⁰, —SR⁷⁰, or —S⁻M⁺.

In addition to the groups disclosed with respect to the individual terms herein, substituent groups for hydrogens on nitrogen atoms in "substituted" heteroalkyl and cycloheteroalkyl groups are, unless otherwise specified, —R⁶⁰, —O⁻M⁺, —OR⁷⁰, —SR⁷⁰, —S-M⁺, —NR⁸⁰R⁸⁰, trihalomethyl, —CF₃, —CN, —NO, —NO₂, —S(O)₂R⁷⁰, —S(O)₂O⁻M⁺, —S(O)₂OR⁷⁰, —OS(O)₂R⁷⁰, —OS(O)₂O⁻M⁺, —OS(O)₂OR⁷⁰, —P(O)(O⁻)₂(M⁺)₂, —P(O)(OR⁷⁰)O⁻M⁺, —P(O)(OR⁷⁰)(OR⁷⁰), —C(O)R⁷⁰, —C(S)R⁷⁰, —C(NR⁷⁰)R⁷⁰, —C(O)OR⁷⁰, —C(S)OR⁷⁰, —C(O)NR⁸⁰R⁸⁰, —C(NR⁷⁰)NR⁸⁰R⁸⁰, —OC(O)R⁷⁰, —OC(S) R⁷⁰, —OC(O)OR⁷⁰, —OC(S)OR⁷⁰, —NR⁷⁰C(O)R⁷⁰, —NR⁷⁰C(S)R⁷⁰, —NR⁷⁰C(O)OR⁷⁰, —NR⁷⁰C(S)OR⁷⁰, —NR⁷⁰C(O)NR⁸⁰R⁸⁰, —NR⁷⁰C(NR⁷⁰) R⁷⁰ and —NR⁷⁰C(NR⁷⁰)NR80R⁸⁰, where R⁶⁰, R⁷⁰, R⁸⁰ and M⁺ are as previously defined.

In addition to the disclosure herein, in a certain embodiment, a group that is substituted has 1, 2, 3, or 4 substituents, 1, 2, or 3 substituents, 1 or 2 substituents, or 1 substituent.

It is understood that in all substituted groups defined above, polymers arrived at by defining substituents with further substituents to themselves (e.g., substituted aryl having a substituted aryl group as a substituent which is itself substituted with a substituted aryl group, which is further substituted by a substituted aryl group, etc.) are not intended for inclusion herein. In such cases, the maximum number of such substitutions is three. For example, serial substitutions of substituted aryl groups specifically contemplated herein are limited to substituted aryl-(substituted aryl)-substituted aryl.

Unless indicated otherwise, the nomenclature of substituents that are not explicitly defined herein are arrived at by naming the terminal portion of the functionality followed by the adjacent functionality toward the point of attachment. For example, the substituent "arylalkyloxycarbonyl" refers to the group (aryl)-(alkyl)-O—C(O)—.

As to any of the groups disclosed herein which contain one or more substituents, it is understood, of course, that such groups do not contain any substitution or substitution patterns which are sterically impractical and/or synthetically non-feasible. In addition, the subject compounds include all stereochemical isomers arising from the substitution of these compounds.

The term "pharmaceutically acceptable salt" means a salt which is acceptable for administration to a patient, such as a mammal (salts with counterions having acceptable mammalian safety for a given dosage regime). Such salts can be derived from pharmaceutically acceptable inorganic or organic bases and from pharmaceutically acceptable inorganic or organic acids. "Pharmaceutically acceptable salt" refers to pharmaceutically acceptable salts of a compound, which salts are derived from a variety of organic and inorganic counter ions well known in the art and include, by way of example only, sodium, potassium, calcium, magnesium, ammonium, tetraalkylammonium, and the like; and when the molecule contains a basic functionality, salts of organic or inorganic acids, such as hydrochloride, hydrobromide, formate, tartrate, besylate, mesylate, acetate, maleate, oxalate, and the like.

The term "salt thereof" means a compound formed when a proton of an acid is replaced by a cation, such as a metal cation or an organic cation and the like. Where applicable, the salt is a pharmaceutically acceptable salt, although this is not required for salts of intermediate compounds that are not intended for administration to a patient. By way of example, salts of the present compounds include those wherein the compound is protonated by an inorganic or organic acid to form a cation, with the conjugate base of the inorganic or organic acid as the anionic component of the salt.

"Solvate" refers to a complex formed by combination of solvent molecules with molecules or ions of the solute. The solvent can be an organic compound, an inorganic compound, or a mixture of both. Some examples of solvents include, but are not limited to, methanol, N,N-dimethylformamide, tetrahydrofuran, dimethylsulfoxide, and water. When the solvent is water, the solvate formed is a hydrate.

"Stereoisomer" and "stereoisomers" refer to compounds that have same atomic connectivity but different atomic arrangement in space. Stereoisomers include cis-trans isomers, E and Z isomers, enantiomers, and diastereomers.

"Tautomer" refers to alternate forms of a molecule that differ only in electronic bonding of atoms and/or in the position of a proton, such as enol-keto and imine-enamine tautomers, or the tautomeric forms of heteroaryl groups containing a —N═C(H)—NH— ring atom arrangement, such as pyrazoles, imidazoles, benzimidazoles, triazoles, and tetrazoles. A person of ordinary skill in the art would recognize that other tautomeric ring atom arrangements are possible.

It will be appreciated that the term "or a salt or solvate or stereoisomer thereof" is intended to include all permutations of salts, solvates and stereoisomers, such as a solvate of a pharmaceutically acceptable salt of a stereoisomer of subject compound.

Compounds

Provided are compounds that can find use as nitrosation reagents. These compounds can be of formula (I):

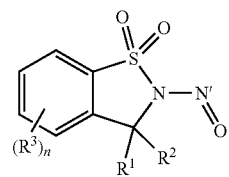

(I)

wherein:
n is 0 to 4,
N' is ¹⁴N or ¹⁵N, and
R¹, R² and each R³ are each independently selected from hydrogen, alkyl, substituted alkyl, alkenyl, substituted alkenyl, alkynyl, substituted alkynyl, cycloalkyl, substituted cycloalkyl, heterocycle, substituted heterocycle, aryl, substituted aryl, heteroaryl, substituted heteroaryl, halo, and hydroxyl.

In some cases, n is 0. In other cases, n is an integer from 1 to 4, such as 1, 2, 3, or 4.

In some cases, R¹ and R² are each independently selected from H, alkyl, substituted alkyl, aryl, substituted aryl, heteroaryl, substituted heteroaryl, and halo. In some cases, R¹ and R² are each independently selected from H, methyl, phenyl, fluoro, and trifluoromethyl.

In some cases, R¹ and R² are the same group, e.g. both H, both alkyl (e.g. methyl), both aryl (e.g. phenyl), both halo (e.g. fluoro). In other cases, R¹ and R² are different groups.

In some cases, N' is ¹⁴N. In other cases, N' is ¹⁵N.

Also provided are compositions including compounds of formula (I). In some cases, the composition includes compounds of formula (I) and the percentage of the compounds where N' is $^{15}$N is 5% or more, such as 20% or more, 50% or more, 90% or more, or 98% or more. Exemplary compounds wherein N' is $^{14}$N or $^{15}$N are shown below.

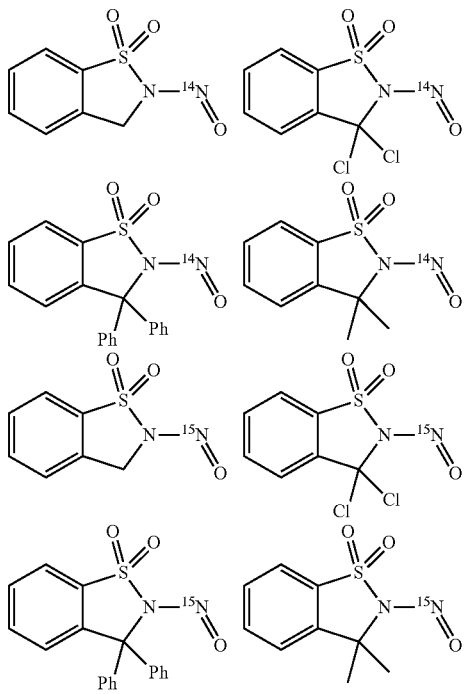

Methods

Provided are nitrosation methods that include reacting a substrate with a nitrosation composition including one of the provided nitrosation reagents and thereby generating a nitrosation product. For example, the method can include reacting the substrate with a compound of formula (I). In some cases, the nitrosation composition consists of, or consists essentially of, the one provided nitrosation reagent.

In some cases, the nitrosation method includes reacting a substrate with a nitrosation reagent provided herein and thereby generating a nitrosation product.

In some cases of the method:

the substrate has the formula E-H or E'',

E is selected from the group consisting of: —SR$^A$, —OR$^A$, —NR$^A$R$^B$, —PR$^A$R$^B$, —CR$^A$R$^B$R$^C$, and —SiR$^A$R$^B$R$^C$, R$^A$, R$^B$, and R$^C$ are each independently selected from the group consisting of hydrogen, alkyl, substituted alkyl, alkenyl, substituted alkenyl, alkynyl, substituted alkynyl, cycloalkyl, substituted cycloalkyl, heterocycle, substituted heterocycle, aryl, substituted aryl, heteroaryl, substituted heteroaryl, at least one of R$^A$, R$^B$, and R$^C$ is a non-hydrogen group, and the reacting generates a product of formula E-NO.

In some cases, E is selected from the group consisting of:—SR$^A$, —OR$^A$, and —NR$^A$R$^B$.

In some cases, the substrate has the formula E-H.

In some cases, the substrate has the formula E-H, the reacting generates a product of formula E-NO, wherein E has the formula (II):

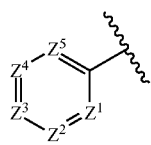

wherein:

Z$^1$, Z$^2$, Z$^3$, Z$^4$, and Z$^5$ are each independently selected from CR' and N, and each R' is independently selected from the group consisting of hydrogen, alkyl, substituted alkyl, alkenyl, substituted alkenyl, alkynyl, substituted alkynyl, cycloalkyl, substituted cycloalkyl, heterocycle, substituted heterocycle, aryl, substituted aryl, heteroaryl, substituted heteroaryl.

In some cases, Z$^1$, Z$^2$, Z$^3$, Z$^4$, and Z$^5$ are each CR'. In some cases, each R' is independently selected from the group consisting of hydrogen, alkyl, substituted alkyl, aryl, substituted aryl, heteroaryl, substituted heteroaryl.

In some cases, E is —OR$^A$. The —OR$^A$ group can be a primary, secondary, or tertiary alcohol group. In other words, the O of —OR$^A$ can be connected to a primary atom, a secondary atom, or a tertiary atom, respectively. Exemplary primary, secondary, and tertiary alcohols are shown below.

Primary alcohols

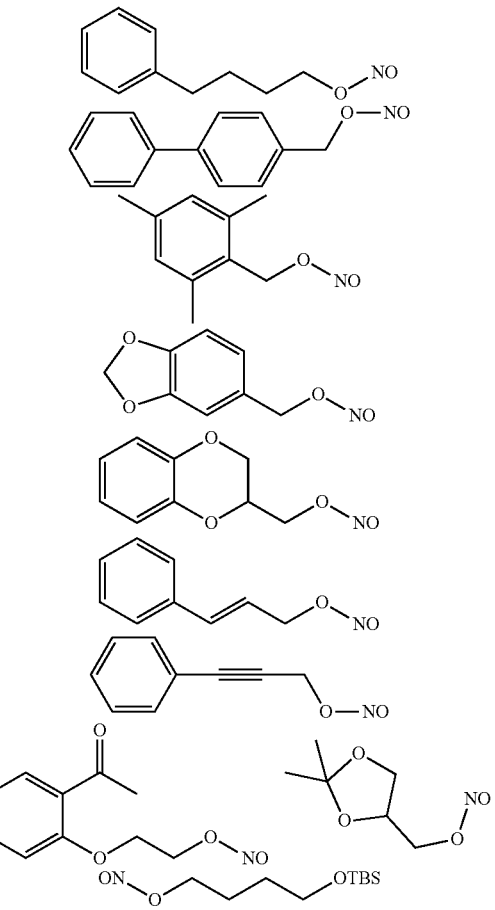

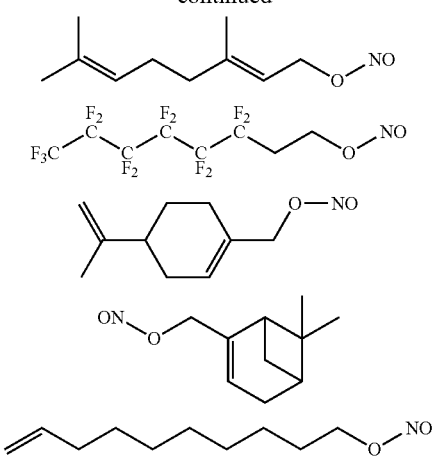
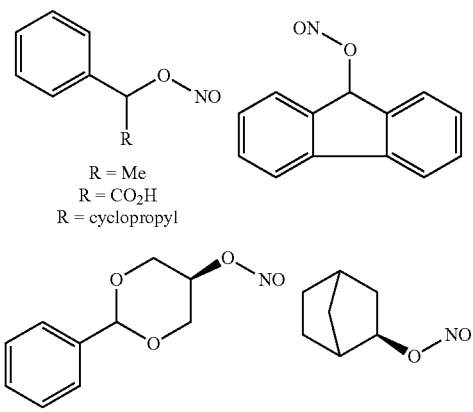
Secondary alcohols
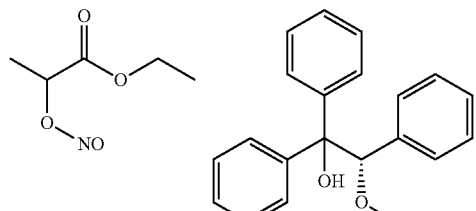
R = Me
R = CO₂H
R = cyclopropyl
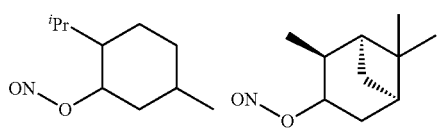
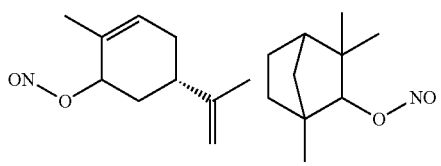
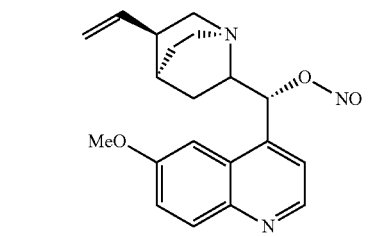
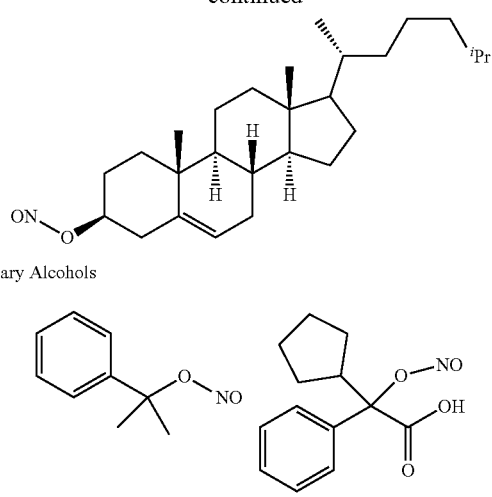
Tertiary Alcohols
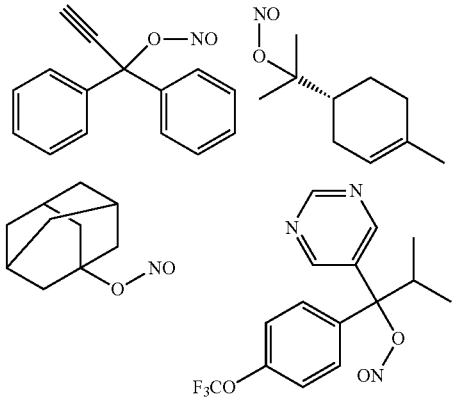
In some cases, E is —SR$^A$. The —SR$^A$ group can be a primary, secondary, or tertiary thiol group.
Primary Thiols
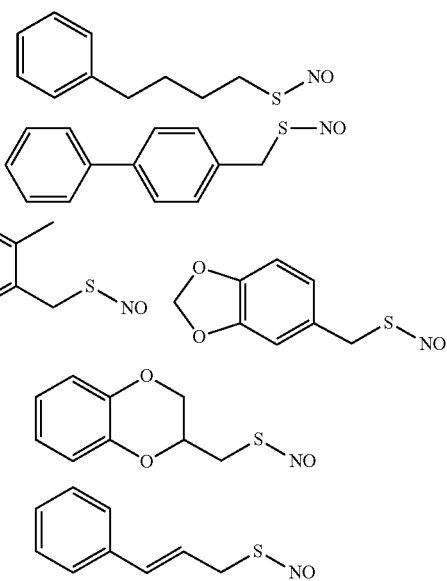

Secondary Thiols
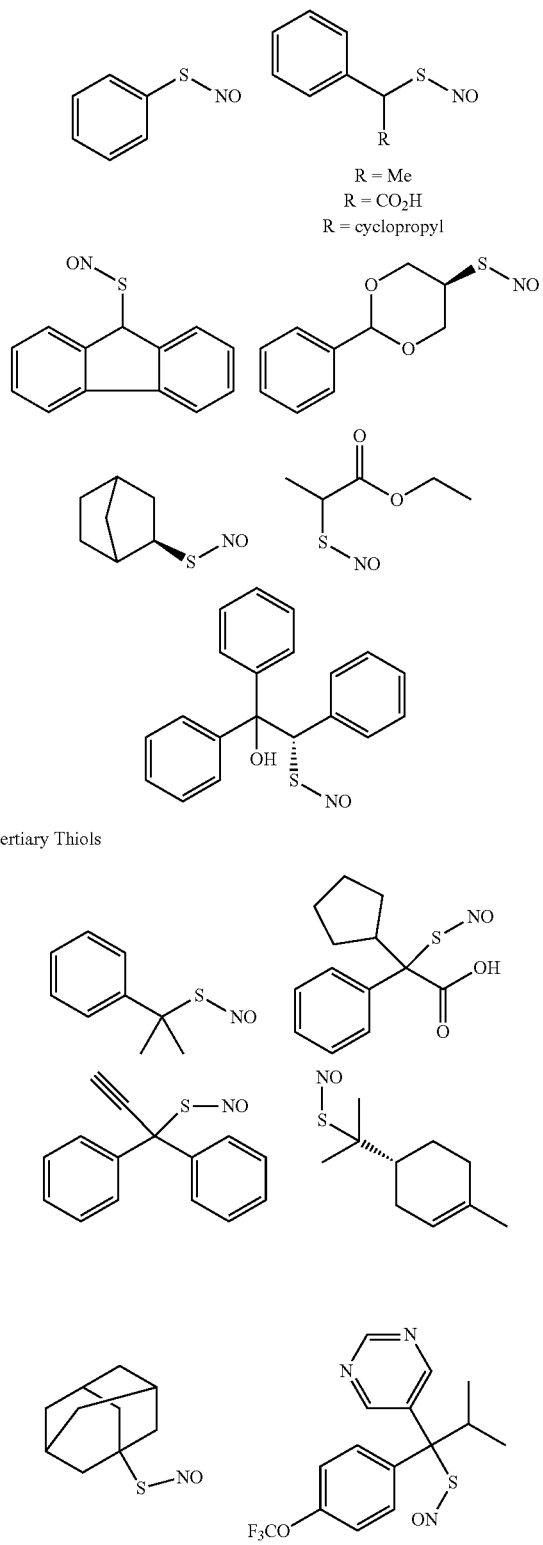
Tertiary Thiols
Primary Amines
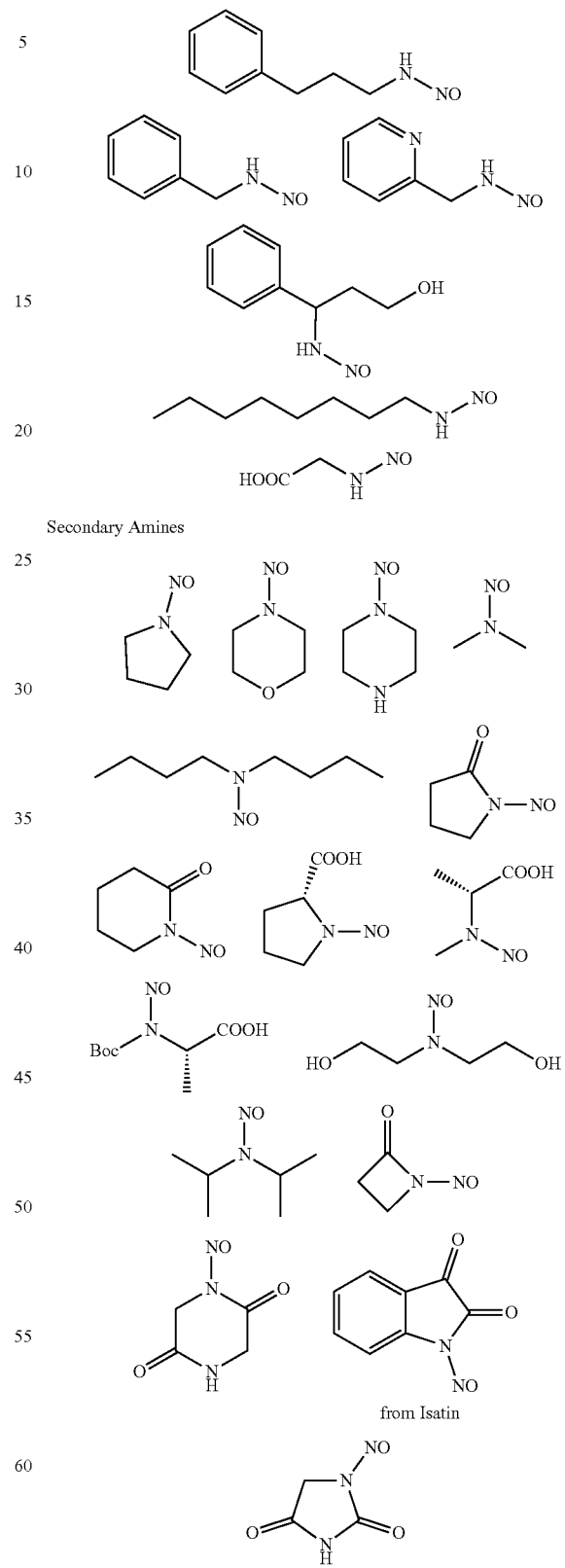
Secondary Amines
from Isatin
from Hydantion
In some cases, E is —NR$^A$R$^B$. The —NR$^A$R$^B$ group can be a primary or secondary amine group. In some cases, R$^B$ is a tert-butyloxycarbonyl group. Exemplary primary and secondary amines are shown below.

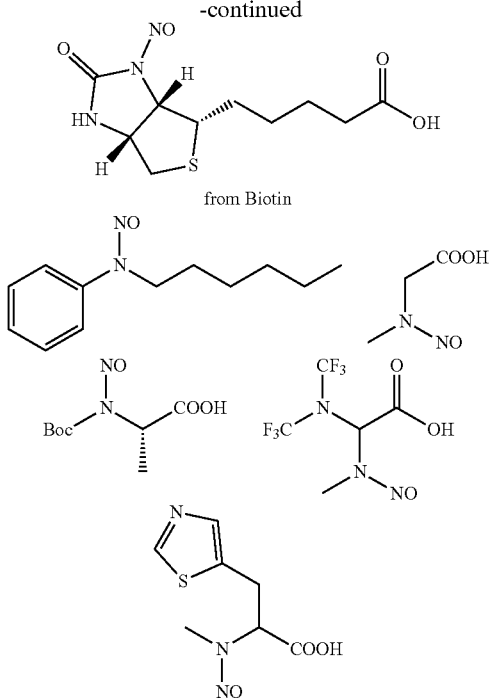

Exemplary amides, ureases, and biorelevant molecules are shown below. As shown below, some of the compounds are from Biotin, from Isatin, or from Hydantoin.

Amides, Urease, and Biorelevant Molecules

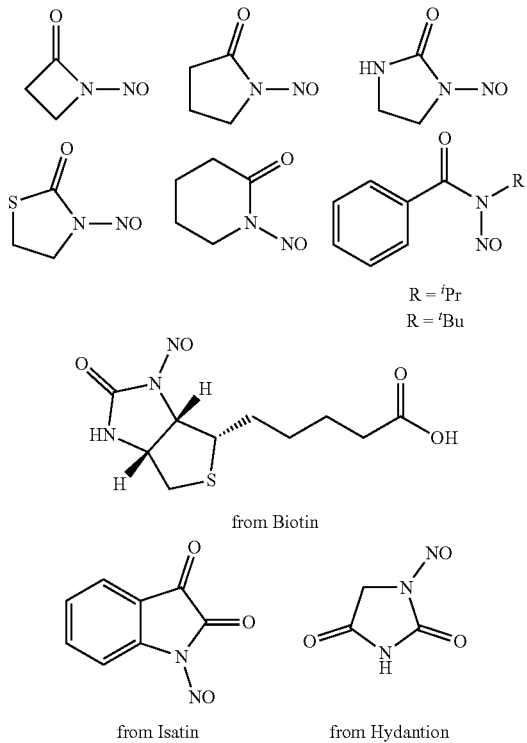

In some cases, $R^A$ in —$OR^A$, —$SR^A$, or $NR^A R^B$ is selected from the group consisting of alkyl, substituted alkyl, aryl, substituted aryl, heteroaryl, and substituted heteroaryl.

In certain embodiments, the nitrosation method can be used to generate a 1,3-triazene (e.g., 1,3-diphenyltriazene) product. An example of a method for producing a 1,3-triazene (e.g., 1,3-diphenyltriazene) product is shown in the reaction scheme below:

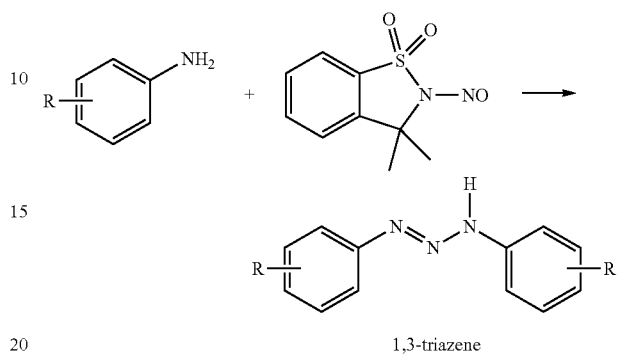

1,3-triazene

For example, in some cases of the method:
the substrate has the formula

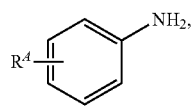

and
the reacting generates a product of formula

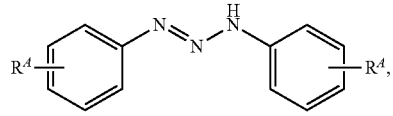

wherein each $R^A$ is independently selected from the group consisting of hydrogen, halogen, alkyl, substituted alkyl, cycloalkyl, substituted cycloalkyl, heterocycle, substituted heterocycle, aryl, substituted aryl, heteroaryl, substituted heteroaryl.

In some cases, $R^A$ is at the ortho position relative to the —$NH_2$. In some cases, $R^A$ is at the meta position relative to the —$NH_2$. In some cases, $R^A$ is at the para position relative to the —$NH_2$.

In some cases, $R^A$ is hydrogen. In some cases, $R^A$ is halogen (e.g., F, Cl, Br, I). In some cases, $R^A$ is alkyl (e.g., methyl, ethyl, propyl, such as n-propyl or iso-propyl).

In some cases, the substrate is selected from the following structures:

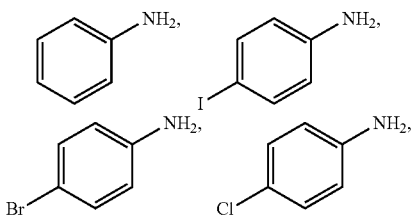

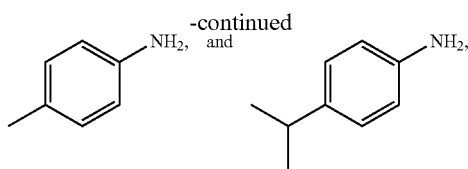

or combinations thereof.

In some cases, the nitrosation product is selected from the following structures:

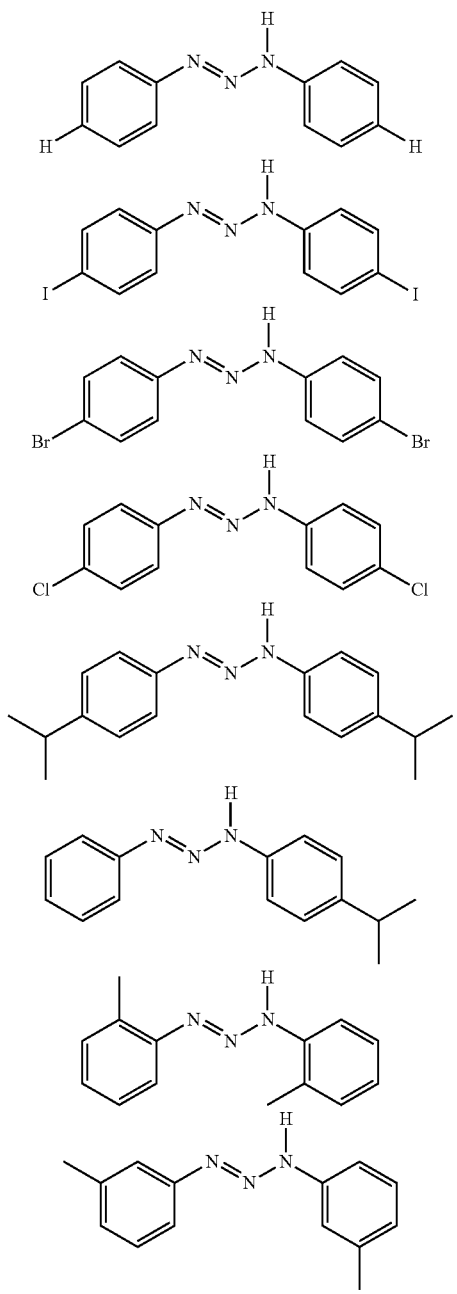

In certain embodiments, the nitrosation method can be used with a substrate that contains a boron group. An example of this method is shown in the reaction scheme below:

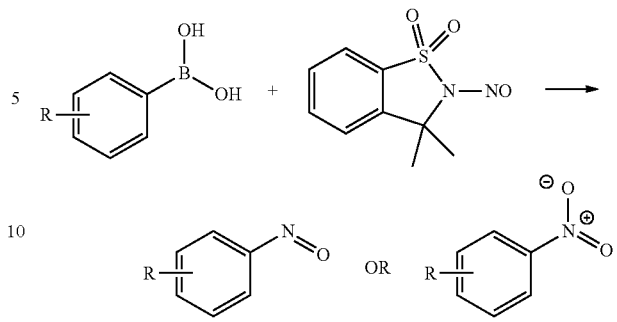

For example, in some cases of the method:

the substrate has the formula $E-B(OH)_2$;

E is selected from the group consisting of alkyl, substituted alkyl, alkenyl, substituted alkenyl, alkynyl, substituted alkynyl, cycloalkyl, substituted cycloalkyl, heterocycle, substituted heterocycle, aryl, substituted aryl, heteroaryl, and substituted heteroaryl, wherein E is optionally substituted with one or more $R^A$ groups;

each $R^A$ is each independently selected from the group consisting of hydrogen, halogen, cyano, alkyl, substituted alkyl, alkenyl, substituted alkenyl, alkynyl, substituted alkynyl, alkoxy, substituted alkoxy, cycloalkyl, substituted cycloalkyl, heterocycle, substituted heterocycle, aryl, substituted aryl, heteroaryl, and substituted heteroaryl, and the reacting generates a nitrosation product of formula $E-NO$ or $E-NO_2$.

In some cases, E is aryl. In some cases, E is phenyl.

In some cases, $R^A$ is selected from hydrogen, halogen, cyano, alkyl, substituted alkyl, alkenyl, substituted alkenyl, alkynyl, substituted alkynyl, alkoxy, substituted alkoxy, cycloalkyl, substituted cycloalkyl, heterocycle, substituted heterocycle, aryl, substituted aryl, heteroaryl, and substituted heteroaryl.

In some cases, $R^A$ is selected from the group consisting of hydrogen, halogen, cyano, alkyl, substituted alkyl, and alkoxy. For example, in some cases, $R^A$ is hydrogen. In some cases, $R^A$ is halogen (e.g., F, Cl, Br, I). In some cases, $R^A$ is alkyl (e.g., methyl). In some cases, $R^A$ is substituted alkyl. For example, substituted alkyl can include, but is not limited to, substituted methyl, such as trifluoromethyl or methoxyacyl. In some cases, $R^A$ is alkoxy (e.g., methoxy). In some cases, $R^A$ is cyano.

In some cases, the nitrosation product has the formula E-NO. In some cases, the nitrosation product has the formula $E-NO_2$.

In some cases, the substrate is selected from the following structures:

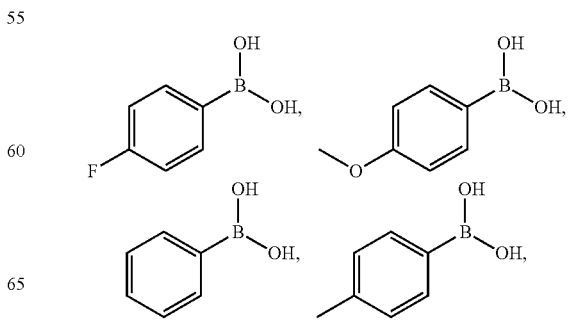

-continued

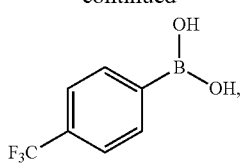

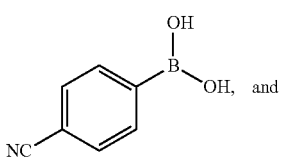

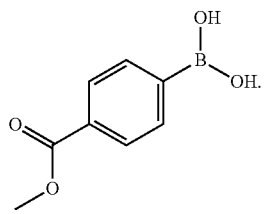

In some cases, the nitrosation product is selected from the following structures:

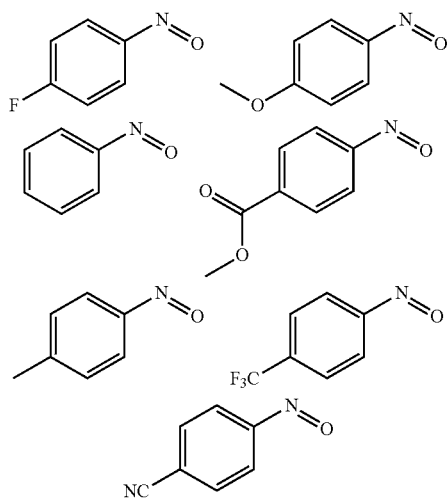

In some cases, the nitrosation product is selected from the following structures:

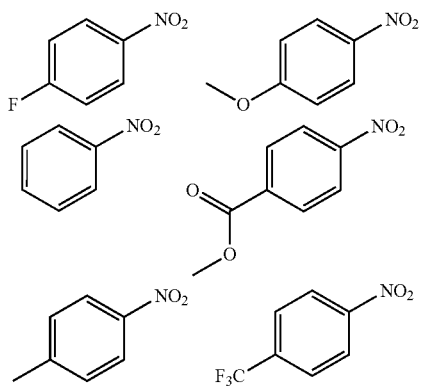

-continued

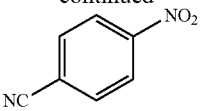

In some cases, the method further includes isolating the product generated by the reacting. For example, the method can include filtration, solvent extraction, or chromatography. In some cases, the method further includes purifying the product generated by the reacting. For example, the method can include chromatography or recrystallization.

Any suitable type of substrate can be employed. In some cases, the substrate is an organic molecule with a molecular weight of 1000 g/mol or less, such as 500 g/mol or less or 250 g/mol or less. In some cases, the substrate is a polynucleotide, a polypeptide, a protein, or an antibody.

In some cases, the nitrosation composition is isotopically enriched in $^{15}N$. This allows for the selective attachment of a $^{15}N$ atom to the substrate at a particular location. Afterwards, the $^{15}N$ atom can be selectively detected using various methods known in the art, such as Nitrogen-15 Nuclear Magnetic Resonance Spectroscopy. In some cases, the nitrosation composition includes molecules of formula (I) and the percentage of the molecules where N' is $^{15}N$ is 5% or more, such as 20% or more, 50% or more, 90% or more, or 98% or more.

The nitrosation method and reagents provided herein allows for good functional group tolerance. In other words, even if the substrate has various functional groups besides the functional group to be nitrosated, the nitrosation will still happen successfully and side reactions with the other functional groups will be minimized or avoided. In some cases, these other functional groups include: carboxylic acid, salt of carboxylic acid, carbonyl, ether, thioether, amide, alkene, alkyne, C—F bond, silyl ether, tert-butyloxycarbonyl (BOC) group, and tert-butyldimethylsilyl ether (TBS ether) group.

The nitrosation method and reagents also allow for successful nitrosation under various convenient laboratory conditions. The reacting can be performed in ambient air, e.g, wherein the relative humidity is 2% or more, wherein the oxygen level is 2% or more. The reacting can be performed at various temperatures, such as −30° C. to 110° C., −10° C. to 80° C., or 10° C. to 50° C. The reacting can be performed at a temperature of 150° C. or less, such as 120° C. or less, 90° C. or less, or 60° C. or less. In some instances, the reacting is performed at room temperature.

The nitrosation method can be performed in various solvents, e.g. an organic solvent, an aqueous solvent, or a mixture of an organic solvent and water. In some cases the aqueous solvent has a pH of 3 or more, such as 4 or more, 5 or more, or 6 or more. In some cases, the reacting is performed neat.

In some cases, the reaction is performed without an oxidizing agent.

In some cases, the yield of the reaction is 20% or more, such as 30% or more, 40% or more, 50% or more, 60% or more, 70% or more, 80% or more, or 90% or more.

Kits and Compositions

Provided is a kit that includes a composition comprising a compound of formula (I) and a container containing the composition. The compound of formula (I) can have any of the properties and features described above in the Compounds section. In addition, in some cases the kit is directed towards performing isotopically-enriched nitrosation. As such, in some cases, composition includes molecules of formula (I) and the percentage of the molecules where N' is $^{15}$N is 5% or more, such as 20% or more, 50% or more, 90% or more, or 98% or more.

Provided is a composition comprising a compound of formula (I). The compound of formula (I) can have any of the properties and features described above in the Compounds section. In some cases, the composition is isotopically enriched. As such, in some cases, composition includes molecules of formula (I) and the percentage of the molecules where N' is 15N is 5% or more, such as 20% or more, 50% or more, 90% or more, or 98% or more.

Notwithstanding the appended claims, the disclosure is also defined by the following clauses:

1. A compound of formula (I):

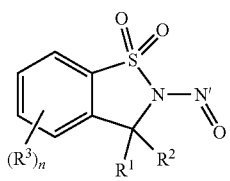

(I)

wherein:
n is 0 to 4,
N' is $^{14}$N or $^{15}$N, and
$R^1$, $R^2$, and each $R^3$ are each independently selected from hydrogen, alkyl, substituted alkyl, alkenyl, substituted alkenyl, alkynyl, substituted alkynyl, cycloalkyl, substituted cycloalkyl, heterocycle, substituted heterocycle, aryl, substituted aryl, heteroaryl, substituted heteroaryl, halo, and hydroxyl.

2. The compound of clause 1, wherein n is 0.
3. The compound of clause 1, wherein n is 1 to 4.
4. The compound of any one of clauses 1-3, wherein $R^1$ and $R^2$ are each independently selected from H, alkyl, substituted alkyl, aryl, substituted aryl, heteroaryl, substituted heteroaryl, and halo.
5. The compound of clause 4, wherein at least one of $R^1$ and $R^2$ is a non-hydrogen group.
6. The compound of clauses 4, wherein $R^1$ and $R^2$ are each independently selected from H, methyl, phenyl, fluoro, and trifluoromethyl.
7. The compound of any one of clauses 1-6, wherein $R^1$ and $R^2$ are the same group.
8. The compound of clause 7, wherein $R^1$ and $R^2$ are both H, both methyl, both phenyl, or both fluoro.
9. The compound of any one of clauses 1-6, wherein $R^1$ and $R^2$ are different groups.
10. The compound of any one of clauses 1-9, wherein N' is $^{14}$N.
11. The compound of any one of clauses 1-9, wherein N' is $^{15}$N.
12. A nitrosation method, comprising:
    reacting a substrate with a nitrosation composition comprising a compound of any one of clauses 1-11 and thereby generating a nitrosation product.
13. The method of clause 12, wherein:
    the substrate has the formula E-H or E,
    E is selected from the group consisting of: —$SR^A$, —$OR^A$, —$NR^AR^B$, —$PR^AR^B$, —$CR^AR^BR^C$, and —$SiR^AR^BR^C$,
    $R^A$, $R^B$, and $R^C$ are each independently selected from the group consisting of hydrogen, alkyl, substituted alkyl, alkenyl, substituted alkenyl, alkynyl, substituted alkynyl, cycloalkyl, substituted cycloalkyl, heterocycle, substituted heterocycle, aryl, substituted aryl, heteroaryl, substituted heteroaryl,
    at least one of $R^A$, $R^B$, and $R^C$ is a non-hydrogen group, and
    the reacting generates a product of formula E-NO.
14. The method of clause 13, wherein E is selected from the group consisting of: —$SR^A$, —$OR^A$, and —$NR^AR^B$.
15. The method of any one of clauses 13-14, wherein the substrate has the formula E-H.
16. The method of clause 12, wherein the substrate has the formula E-H, the reacting generates a product of formula E-NO, wherein E has the formula (II):

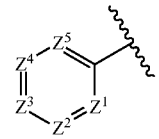

(II)

wherein:
$Z^1$, $Z^2$, $Z^3$, $Z^4$, and $Z^5$ are each independently selected from CR' and N, and
each R' is independently selected from the group consisting of hydrogen, alkyl, substituted alkyl, alkenyl, substituted alkenyl, alkynyl, substituted alkynyl, cycloalkyl, substituted cycloalkyl, heterocycle, substituted heterocycle, aryl, substituted aryl, heteroaryl, substituted heteroaryl.

17. The method of clause 16, wherein $Z^1$, $Z^2$, $Z^3$, $Z^4$, and $Z^5$ are each CR'.
18. The method of any one of clauses 16-17, wherein each R' is independently selected from the group consisting of hydrogen, alkyl, substituted alkyl, aryl, substituted aryl, heteroaryl, substituted heteroaryl.
19. The method of any one of clauses 13-15, wherein E is —$SR^A$.
20. The method of clause 19, wherein —$SR^A$ is a primary thiol group.
21. The method of clause 19, wherein —$SR^A$ is a secondary thiol group.
22. The method of clause 19, wherein —$SR^A$ is a tertiary thiol group.
23. The method of any one of clauses 13-15, wherein E is —$OR^A$.
24. The method of clause 23, wherein —$OR^A$ is a primary alcohol group.
25. The method of clause 23, wherein —$OR^A$ is a secondary alcohol group.
26. The method of clause 23, wherein —$OR^A$ is a tertiary alcohol group.
27. The method of any one of clauses 13-15, wherein E is —$NR^AR^B$.
28. The method of clause 27, wherein —$NR^AR^B$ is a primary amine group.
29. The method of clause 27, wherein —$NR^AR^B$ is a secondary amine group.
30. The method of any one of clauses 27-30, wherein $R^B$ is a tert-butyloxycarbonyl group.
31. The method of any one of clauses 13-15 and 19-30, wherein $R^A$ is selected from the group consisting of alkyl, substituted alkyl, aryl, substituted aryl, heteroaryl, and substituted heteroaryl.

32. The method of clause 12, wherein:
the substrate has the formula

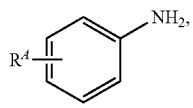

and
the reacting generates a product of formula

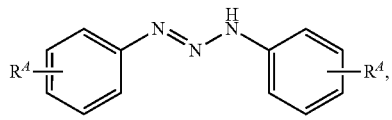

wherein each $R^A$ is independently selected from the group consisting of hydrogen, halogen, alkyl, substituted alkyl, cycloalkyl, substituted cycloalkyl, heterocycle, substituted heterocycle, aryl, substituted aryl, heteroaryl, substituted heteroaryl.

33. The method of clause 32, wherein $R^A$ is hydrogen.
34. The method of clause 32, wherein $R^A$ is halogen.
35. The method of clause 32, wherein $R^A$ is alkyl.
36. The method of clause 12, wherein:
the substrate has the formula E-B(OH)2;
E is selected from the group consisting of alkyl, substituted alkyl, alkenyl, substituted alkenyl, alkynyl, substituted alkynyl, cycloalkyl, substituted cycloalkyl, heterocycle, substituted heterocycle, aryl, substituted aryl, heteroaryl, and substituted heteroaryl, wherein E is optionally substituted with one or more $R^A$ groups;
each $R^A$ is each independently selected from the group consisting of hydrogen, halogen, cyano, alkyl, substituted alkyl, alkenyl, substituted alkenyl, alkynyl, substituted alkynyl, alkoxy, substituted alkoxy, cycloalkyl, substituted cycloalkyl, heterocycle, substituted heterocycle, aryl, substituted aryl, heteroaryl, and substituted heteroaryl, and
the reacting generates a nitrosation product of formula E-NO or E-NO$_2$.
37. The method of clause 36, wherein E is aryl.
38. The method of clause 36, wherein E is phenyl.
39. The method of clause 36, wherein $R^A$ is selected from the group consisting of hydrogen, halogen, cyano, alkyl, substituted alkyl, and alkoxy.
40. The method of any one of clauses 12-39, further comprising isolating the product generated by the reacting.
41. The method of any one of clauses 12-40, further comprising purifying the product generated by the reacting.
42. The method of any one of clauses 12-41, wherein the substrate is an organic molecule with a molecular weight of 1000 g/mol or less.
43. The method of any one of clauses 12-41, wherein the substrate is a polynucleotide, a polypeptide, a protein, or an antibody.
44. The method of any one of clauses 12-43, wherein the percentage of molecules of formula (I) in the nitrosation composition where N' is $^{15}N$ is 5% or more.
45. The method of clause 44, wherein the percentage of molecules of formula (I) in the nitrosation composition where N' is $^{15}N$ is 90% or more.
46. The method of any one of clauses 12-45, wherein the substrate comprises one or more chemical moieties selected from the group consisting of: carboxylic acid group, salt of carboxylic acid, carbonyl, ether, thioether, amide, alkene, alkyne, C—F bond, silyl ether, tert-butyloxycarbonyl (BOC) group, and tert-butyldimethylsilyl ether (TBS ether) group.
47. The method of any one of clauses 12-46, wherein the reacting is performed in air with relative humidity of 2% or more.
48. The method of any one of clauses 12-47, wherein the reacting is performed in air with an oxygen level of 2% or more.
49. The method of any one of clauses 12-48, wherein the reacting is performed at a temperature ranging from 10° C. to 50° C.
50. The method of any one of clauses 12-49, wherein the reacting is performed in an organic solvent.
51. The method of any one of clauses 12-49, wherein the reacting is performed in a mixture of organic solvent and water.
52. The method of any one of clauses 12-49, wherein the reacting is performed in an aqueous solvent with a pH of 4 or more.
53. The method of any one of clauses 12-52, wherein the reacting is performed without an oxidizing agent.
54. The method of any one of clauses 12-53, wherein the yield of the reaction is 70% or more.
55. The method of clause 54, wherein the yield of the reaction is 90% or more.
56. A kit, comprising:
a composition comprising a compound of formula (I)

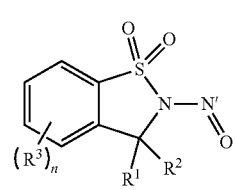

wherein:
n is 0 to 4,
N' is $^{14}N$ or $^{15}N$, and
$R^1$, $R^2$ and each $R^3$ are each independently selected from hydrogen, alkyl, substituted alkyl, alkenyl, substituted alkenyl, alkynyl, substituted alkynyl, cycloalkyl, substituted cycloalkyl, heterocycle, substituted heterocycle, aryl, substituted aryl, heteroaryl, substituted heteroaryl, halo, and hydroxyl; and
a container containing the composition.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric. Standard abbreviations may be used, e.g., bp, base pair(s); kb, kilobase(s); pl, picoliter(s); s or sec, second(s); min, minute(s); h or hr, hour(s); aa, amino acid(s); nt, nucleotide(s); and the like.

Example 1: Synthesis of Nitrosation Reagent and Generalized Nitrosation Procedure Four nitrosation reagents were synthesized according to the reaction schemes shown in FIG. 1.

As an example, the geminal dimethyl nitrosation reagent was synthesized according to the following scheme with the following details:

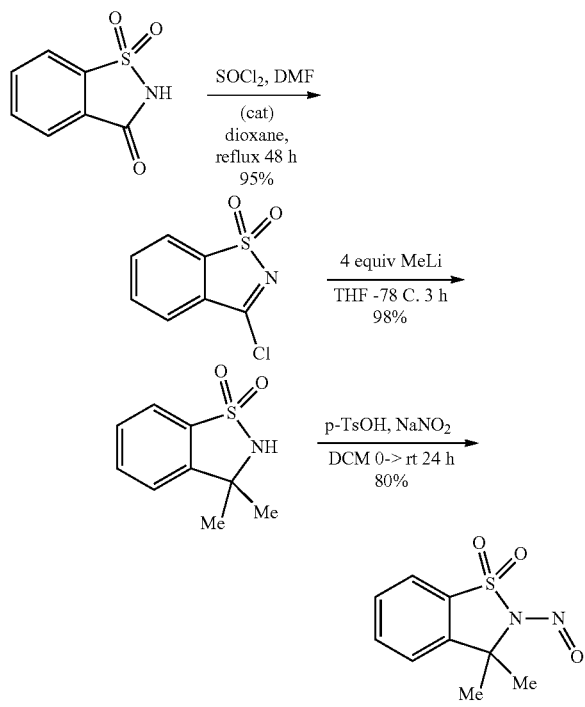

3-chlorobenzo[d]isothiazole 1,1-dioxide. To a 2 L round bottom with a stir bar atop a heating mantle 54.9 g (0.3 mol) of saccharin, 90.0 ml (0.45 mol) of SOCl, and a catalytic amount of DMF (4 ml) was added. The reaction was heated in 250 ml of dioxane for 48 hours at reflux. The clear brown solution was concentrated in vacuo in a rotary evaporator in a heating bath. Crude NMR showed >95% yield. The residue was used in the next step without further purification.

3,3-dimethyl-2,3-dihydrobenzo[d]isothiazole 1,1-dioxide. To a 250 mL round bottom 100 mL of Dry Diethyl Either was added to 20 g of 3-chlorobenzo[d]isothiazole 1,1-dioxide (0.1 mol). The reaction was cooled to −10 C. Slowly added to the chilled solution was 4 equivalents of 1.6 M MeLi. The reaction was stired for 30 min at −10 C. The reaction was warmed to RT and allowed to stir for 2 and a half hours. Once reaction is complete pour into 150 mL of dilute HCL (5%). The organic layer was seperated and washed with water until neutral. The crude reaction was absorbed onto silica and purified with 50/50 EtOAc/ Hexanes. Rf=0.4. The product isolated as a colorless solid in 19.4 g (98% yield).

3,3-dimethyl-2-nitroso-2,3-dihydrobenzo[d]isothiazole 1,1-dioxide. To a large 1 L round bottom 9.865 g (0.10 mol) of 3,3-dimethyl-2,3-dihydrobenzo[d]isothiazole 1,1-dioxide was added with 500 mL of DCM and 17.2 g (0.14 mol) of pTsOH. The mixture was stirred and cooled to 0 C. Slowly added was 10.2 g (0.15 mol) NaNO2. The reaction was left to warm to room temperature and stirred overnight. The was filtered through a Buchner funnel to remove the insoluble material. The filtrate was then absorbed onto silica and purified with column chromatography using only DCM (Rf=0.4) as the mobile phase. Isolated was 18.1 g (80% yield) of greenish yellow material.

Nitrosation of substrates with the geminal dimethyl reagent were conducted as shown in the following diagram. In particular, the threads of a 3 ml borosilicate scintillation vial were thoroughly taped with Teflon tape. To this vial containing a stir bar was added the nitrosation reagent, dichloromethane (such that the reagent was 0.1 M), and the substrate. In some cases heating to 80° C. was involved, and in some cases dichloroethane was used instead of dichloromethane. The reaction was stirred at room temperature for 24 hours. Afterwards, thin layer chromatography was used to determine reaction progression. Upon completion, the solvent was removed under reduced pressure, the crude mixture was directly absorbed onto silica, and then purified by silica gel chromatography to yield the desired product.

Example 2: First Substrate Scope

Nitrosation reactions were performed according to the following reaction scheme. Yields are shown below the chemical structures.

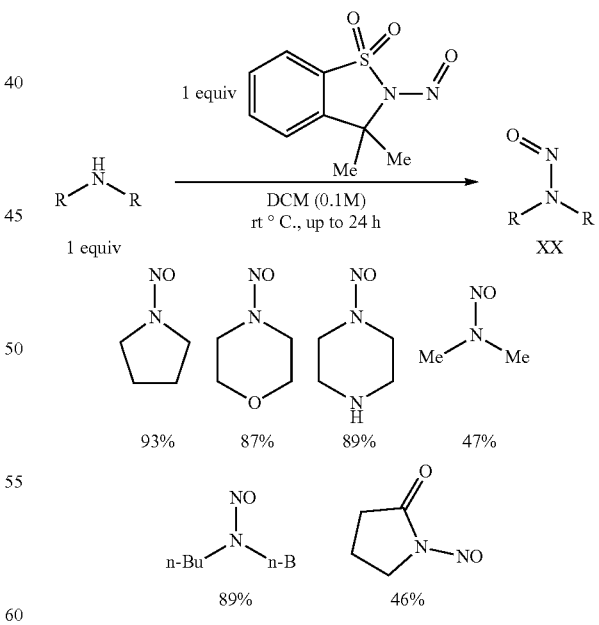

Structure ONLY directly accessible via our new reagent

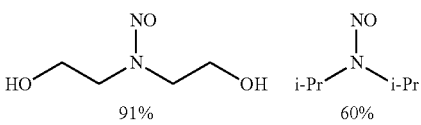

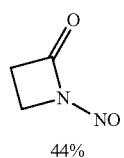
44%
Example 3: Second Substrate Scope
Nitrosation reactions were performed according to the following reaction scheme.
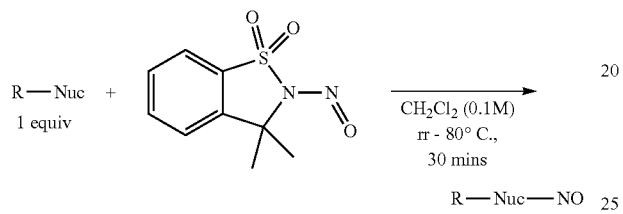
The following yields for the following substrates were observed.
Primary alcohols
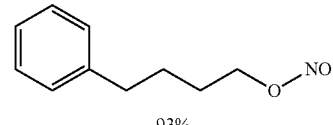
93%
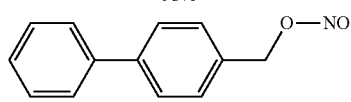
83%
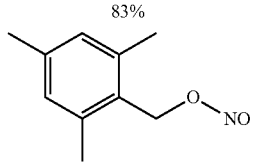
80%
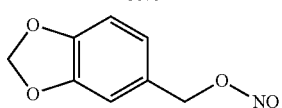
90%
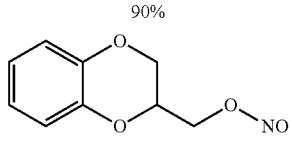
74%
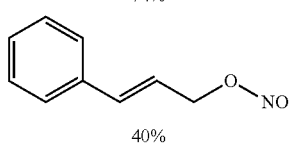
40%
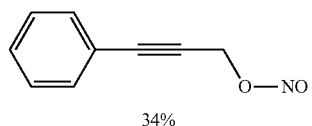
34%
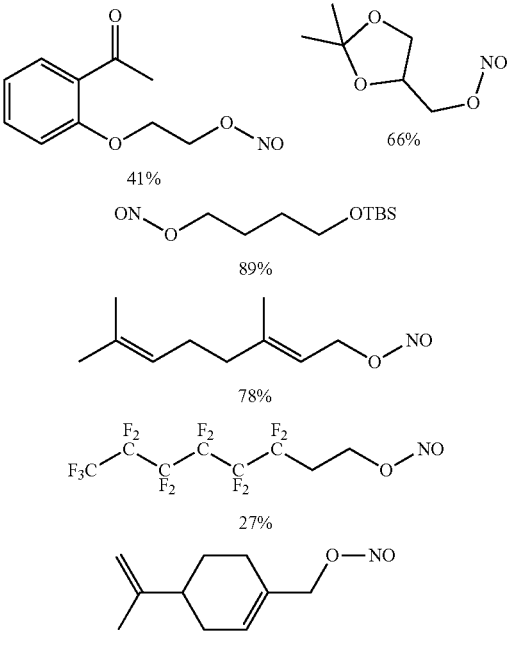
Secondary alcohols
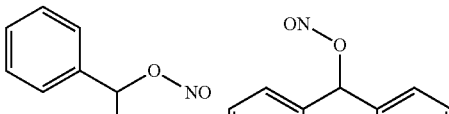
R = Me 60%
R = cyclopropyl 61%
49%
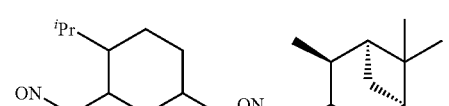
94%
75%
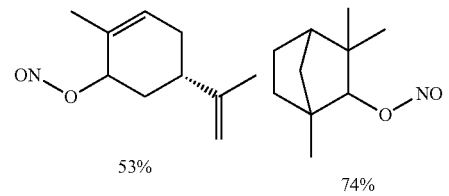
53%
74%

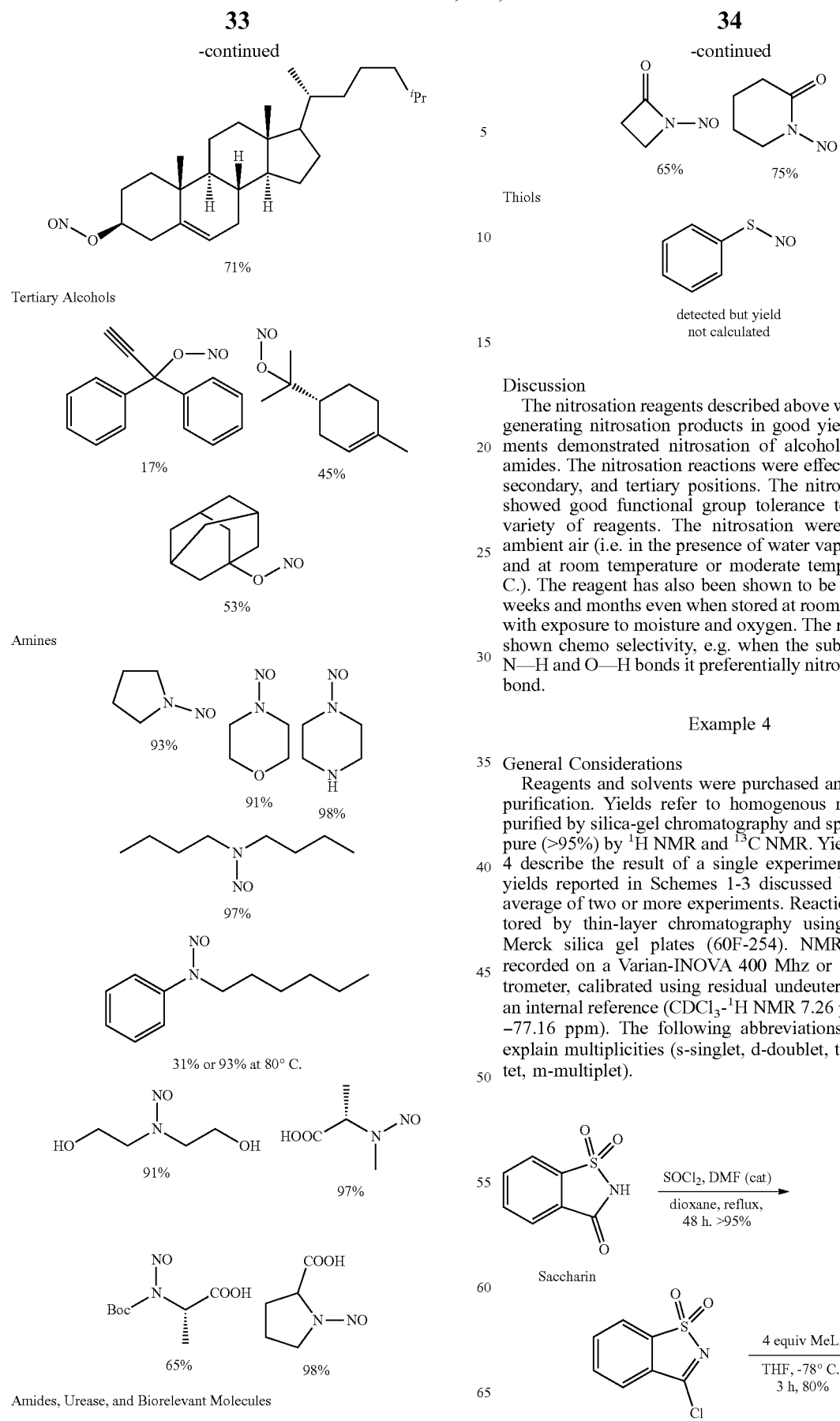

Discussion

The nitrosation reagents described above were effective at generating nitrosation products in good yield. The experiments demonstrated nitrosation of alcohols, amines, and amides. The nitrosation reactions were effective at primary, secondary, and tertiary positions. The nitrosation reagents showed good functional group tolerance towards a wide variety of reagents. The nitrosation were performed in ambient air (i.e. in the presence of water vapor and oxygen) and at room temperature or moderate temperatures (<80° C.). The reagent has also been shown to be shelf-stable for weeks and months even when stored at room temperature an with exposure to moisture and oxygen. The reagent has also shown chemo selectivity, e.g. when the substrate had both N—H and O—H bonds it preferentially nitrosated the N—H bond.

Example 4

General Considerations

Reagents and solvents were purchased and used without purification. Yields refer to homogenous material that is purified by silica-gel chromatography and spectroscopically pure (>95%) by $^1$H NMR and $^{13}$C NMR. Yields in Example 4 describe the result of a single experiment, whereas the yields reported in Schemes 1-3 discussed below were an average of two or more experiments. Reactions were monitored by thin-layer chromatography using 0.25 mm E. Merck silica gel plates (60F-254). NMR spectra were recorded on a Varian-INOVA 400 Mhz or 500 Mhz spectrometer, calibrated using residual undeuterated solvent as an internal reference (CDCl$_3$-$^1$H NMR 7.26 ppm, $^{13}$C NMR −77.16 ppm). The following abbreviations were used to explain multiplicities (s-singlet, d-doublet, t-triplet, q-quartet, m-multiplet).

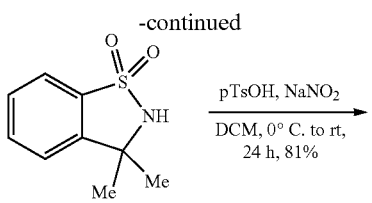

DMBS

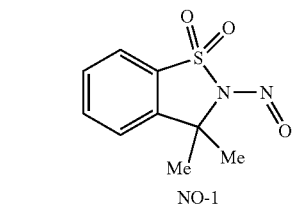

NO-1

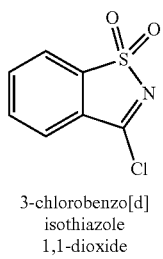

3-chlorobenzo[d]
isothiazole
1,1-dioxide 3-chlorobenzo[d]isothiazole 1,1-dioxide. To a 500 mL round bottom with a stir bar atop a heating mantle 10.1 g (55 mmol) of saccharin, 10.0 mL (138 mmol) of $SOCl_2$, and a catalytic amount of DMF (1 ml) was added in 250 mL of 1,4-dioxane. The reaction was heated for 48 hours at reflux. The clear brown solution was concentrated in vacuo in a rotary evaporator in a heating bath. The residue was used in the next step without further purification.

$^1$H NMR (500 MHZ, $CDCl_3$): 7.93 (d, J=7.3 Hz, 1H), 7.91-7.80 (m, 3H).

$^{13}$C NMR (125 MHz, $CDCl_3$): 166.3, 140.6, 135.1, 134.6, 129.9, 125.3, 122.6.

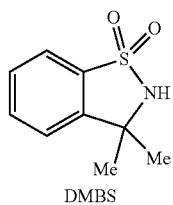

DMBS 3,3-dimethyl-2,3-dihydrobenzo[d]isothiazole 1,1-dioxide (DMBS). To a 250 mL round bottom 100 mL of dry diethyl ether was added to 11 g of 3-chlorobenzo[d]isothiazole 1,1-dioxide (55 mmol). The reaction was cooled to −10° C. Slowly added to the chilled solution was 4 equivalents of 1.6 M MeLi. The reaction was stirred for 30 min at −10° C. The reaction was warmed to RT and allowed to stir for 2.5 h. Once reaction is complete pour into 150 mL of dilute HCL (5%). The organic layer was separated and washed with water until neutral. The crude reaction was absorbed onto silica and purified with EtOAc/Hexanes (50/50). Rf=0.4. The product isolated as a pale yellow solid in 9.9 g (80% yield).

$^1$H NMR (500 MHZ, $CDCl_3$): 7.63 (d, J=7.8 Hz, 1H), 7.57-7.52 (m, 1H), 7.44-7.38 (m, 1H), 7.34 (d, J=7.8 Hz, 1H), 5.42 (s, 1H), 1.56 (s, 6H).

$^{13}$C NMR (125 MHz, $CDCl_3$): 146.0, 134.8, 133.3, 128.9, 122.8, 120.8, 60.8, 29.4.

HRMS (ESI-TOF) m/z: [M+H]+ Calcd for $C_9H_{11}NO_2S$ [M+H]+ 198.0583 found 198.05074.

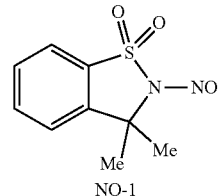

NO-1

3,3-dimethyl-2-nitroso-2,3-dihydrobenzo[d]isothiazole 1,1-dioxide (NO-1). To a large 1 L round bottom 10 g (0.50 mol) of DMBS was added with 250 mL of DCM and 8.6 g (70 mmol) of pTsOH. The mixture was stirred and cooled to 0° C. Slowly added was 5.0 g (72 mmol) NaNO2. The reaction was left to warm to room temperature and stirred overnight. The was filtered through a Buchner funnel to remove the insoluble material. The filtrate was then absorbed onto silica and purified with column chromatography using DCM (Rf=0.4) or 10% EtOAc in hexanes as the mobile phase. Isolated was 8.9 g (81% yield) of greenish yellow solid with melting points of 70C and 90° C. (NO-1a and NO-1b, respectively).

$^1$H NMR (500 MHZ, $CDCl_3$): 7.88-7.75 (m, 2H), 7.64 (t, J=7.7 Hz, 1H), 7.58 (d, J=7.8 Hz, 1H), 1.99 (s, 6H).

$^{13}$C NMR (125 MHz, $CDCl_3$): 135.5, 130.3, 123.5, 122.0, 65.5, 29.6.

HRMS (ESI-TOF) m/z: [M+H]+ Calcd for $C_9H_{10}N_2O_3S$ [M+H]+ 227.0485 found 227.0482.

Reaction Procedures

Safety. Nitroso compounds, especially alkyl nitrites are known to decompose in air to form explosive mixtures. In the case for crystalline solids isolated, the melting point was not reported out of a safety precaution.

[A] General Procedure for Nitrosation. The threads of a 3 mL borosilicate scintillation vial were thoroughly taped with Teflon tape. To this vial containing a stir bar was added substrate (0.2 mmol, 1 equiv), and NO-1 (54.0 mg, 0.24 mmol, 1.2 equiv). Dichloromethane (2 mL) was then added and the reaction was stirred at room temperature on a stir plate until completed (thin-layer chromatography). In some reactions when heating is required (80° C.) the vials are stirred on a hotplate and dichloroethane (2 mL) or acetonitrile (2 mL) was used in replacement of dichloromethane.

Upon completion, the solvent was removed under reduced pressure, crude mixture was directly absorbed onto silica and purified by silica gel chromatography to yield the desired product.

[B] General Procedure for Acid Catalyzed Nitrosation. The threads of a 3 mL borosilicate scintillation vial were thoroughly taped with Teflon tape. To this vial containing a stir bar was added substrate (0.2 mmol, 1 equiv), and NO-1 (54.0 mg, 0.24 mmol, 1.2 equiv). Acetonitrile (2 mL) and trifluoracetic acid (3.1 μL, 20 mol %) was then added and the reaction was stirred at room temperature until completed (thin-layer chromatography).

Upon completion, the solvent was removed under reduced pressure, crude mixture was directly absorbed onto silica and purified by silica gel chromatography to yield the desired product.

Scheme 1 Compounds (1-14)

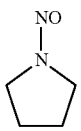

1

1-nitrosopyrrolidine (1). General procedure A was employed using pyrrolidine (17 µL, 0.2 mmol) in dichloromethane. The reaction afforded 1 (18.6 mg, 93% yield) as a pale yellow oil separated by silica gel (30% ethyl acetate in hexanes). The data matches those previously reported.

1H NMR (500 MHz, CDCl$_3$): 4.17 (t, J=6.8 Hz, 1H), 3.48 (t, J=7.1 Hz, 1H), 2.04-1.88 (m, 2H).

13C NMR (125 MHz, CDCl3): 49.7, 45.1, 23.9, 22.5.

HRMS (ESI-TOF) m/z: [M+H]+ Calcd for $C_4H_9N_2O$ 101.0709 found 101.0707.

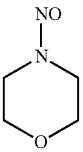

2

4-nitrosomorpholine (2). General procedure A was employed using morpholine (17 mg, 0.2 mmol). The reaction afforded 2 (21.1 mg, 91% yield) as a pale yellow oil separated by silica gel (30% ethyl acetate in hexanes). The data matches those previously reported.

1H NMR (500 MHZ, CDCl3): 4.33-4.25 (m, 1H), 3.92-3.83 (m, 2H), 3.65 (t, J=5.2 Hz, 1H).

13C NMR (125 MHz, CDCl3): 67.4, 66.0, 50.1, 40.5.

HRMS (ESI-TOF) m/z: [M+H]+ Calcd for $C_4H_9N_2O_2$ 117.0659 found 117.0656.

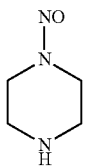

3

1-nitrosopiperazine (3). General procedure A was employed using piperazine (17 µL, 0.2 mmol). The reaction afforded 3 (22.5 mg, 98% yield) as a pale yellow oil separated by silica gel (40% ethyl acetate in hexanes). The data matches those previously reported.

1H NMR (500 MHz, CDCl3): 4.27-4.18 (m, 1H), 3.85-3.78 (m, 1H), 3.11-3.03 (m, 1H), 2.87-2.78 (m, 1H), 2.67 (s, 1H).

13C NMR (125 MHz, CDCl3): 51.1, 46.6, 45.1, 40.8.

HRMS (ESI-TOF) m/z: [M+H]+ Calcd for $C_4H_{10}N_3O$ 116.0818 found 116.0815.

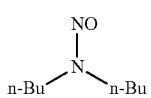

4

N,N-dibutylnitrous amide (4). General procedure A was employed using dibutylamine (36 µL, 0.2 mmol). The reaction afforded 4 (30.7 mg, 97% yield) as a yellow oil separated by silica gel (40% ethyl acetate in hexanes). The data matches those previously reported.

1H NMR (500 MHZ, CDCl3): 4.06 (t, J=7.3 Hz, 2H), 3.58-3.48 (m, 2H), 1.77-1.66 (m, 2H), 1.49-1.41 (m, 2H), 1.41-1.33 (m, 2H), 1.32-1.23 (m, 2H), 0.95 (t, J=7.4 Hz, 3H), 0.90 (t, J=7.3 Hz, 3H).

13C NMR (125 MHz, CDCl$_3$): 52.1, 43.6, 30.4, 28.2, 20.5, 19.9, 13.8, 13.7.

HRMS (ESI-TOF) m/z: [M+H]+ Calcd for $C_{10}H_{12}NO_4$ 159.1492 found 159.1486.

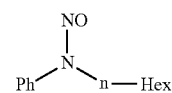

5

N-hexyl-N-phenylnitrous amide (5). General procedure A was employed using N-hexylaniline (40 µL, 0.2 mmol). The reaction afforded 5 (41.0 mg, 93% yield) as a pale yellow oil separated by silica gel (10% DCM in hexanes).

1H NMR (500 MHz, CDCl3): 7.53 (d, J=7.6 Hz, 2H), 7.47 (t, J=7.4 Hz, 2H), 7.36 (t, J=6.9 Hz, 1H), 4.08-3.95 (m, 2H), 1.54 (s, 2H), 1.27 (s, 6H), 0.86 (s, 3H).

13C NMR (125 MHz, CDCl3): 141.8, 129.6, 127.4, 119.8, 44.1, 31.4, 26.8, 26.6, 22.6, 14.1.

HRMS (ESI-TOF) m/z: [M+H]+ Calcd for $C_{12}H_{19}N_2O$ 207.1492 found 207.1491.

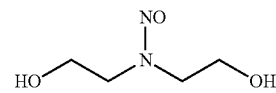

6

N,N-bis(2-hydroxyethyl) nitrous amide (6). General procedure A was employed using diethanolamine (19 µL, 0.2 mmol). The reaction afforded 6 (24.4 mg, 91% yield) as a pale yellow oil separated by silica gel (10% MeOH in DCM). The data matches those previously reported.

1H NMR (500 MHZ, (CD$_3$)$_2$SO): 4.92 (t, J=5.5 Hz, 1H), 4.85 (t, J=5.5 Hz, 1H), 4.18 (t, J=5.6 Hz, 2H), 3.72 (q, J=5.5 Hz, 2H), 3.66 (t, J=6.0 Hz, 2H), 3.44 (q, J=5.8 Hz, 2H).

13C NMR (125 MHz, (CD$_3$)$_2$SO): 58.7, 56.8, 55.1, 46.5.

HRMS (ESI-TOF) m/z: [M+H]+ Calcd for $C_4H_{11}N_2O_3$ 135.0764 found 135.0797.

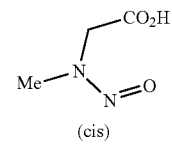

7

(cis)

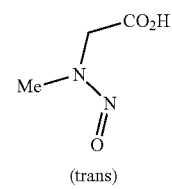

7

(trans)

N-methyl-N-nitrosoglycine (7). General procedure A was employed using Sarcosine (18 mg, 0.2 mmol) in dichloroethane. The reaction afforded 7 (trans) and 7 (cis) as a mixture of rotamers in a 1:1 ratio (21.2 mg, 90% yield) as a pale yellow oil separated by silica gel (10% MeOH in DCM).

(7 Trans) and (7 Cis)

1H NMR (500 MHz, CDCl3): 10.25 (s, 1H), 5.02 (s, 2H), 4.31 (s, 2H), 3.91 (s, 3H), 3.14 (s, 3H).

13C NMR (125 MHz, CDCl$_3$): 172.6, 170.7, 54.4, 46.7, 40.1, 32.9.

HRMS (ESI-TOF) m/z: [M+H]+ Calcd for $C_3H_7N_2O_3$ 119.0451 found 119.0448.

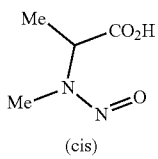
(cis) 8

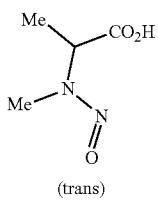
(trans) 8

N-methyl-N-nitrosoalanine. General procedure A was employed using DL-Alanine (21 mg, 0.2 mmol) in dichloroethane. The reaction afforded 8 (trans) and 8 (cis) as a mixture of rotamers in a 1:3 ratio (25.6 mg, 97% yield) as a pale yellow oil separated by silica gel (100% ethyl acetate).

(8 Trans) and (8 Cis)

1H NMR (500 MHz, CDCl3): 11.70 (s, 1H), 5.47 (q, J=7.0 Hz, 1H), 5.10 (q, J=7.0 Hz, 1H), 3.81 (s, 3H), 3.05 (s, 3H), 1.71 (d, J=7.1 Hz, 3H), 1.46 (d, J=7.0 Hz, 3H).

13C NMR (125 MHz, CDCl$_3$): 174.4, 173.5, 61.0, 52.0, 36.7, 30.3, 15.5, 12.9.

HRMS (ESI-TOF) m/z: [M+H]+ Calcd for $C_4H_9N_2O_3$ 133.0608 found 133.0604.

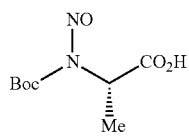
9

N-(tert-butoxycarbonyl)-N-nitroso-L-alanine (9). General procedure B was employed using Boc-Ala-OH (38 mg, 0.2 mmol). The reaction afforded 9 (31.8 mg, 73% yield) as a pale yellow oil separated by silica gel (5-10% MeOH in DCM).

1H NMR (500 MHz, CDCl3): 5.36-5.26 (m, 1H), 1.64 (s, 9H), 1.35 (d, J=7.0 Hz, 3H).

13C NMR (125 MHz, CDCl3): 174.6, 151.1, 86.6, 47.9, 28.1, 13.8.

HRMS (ESI-TOF) m/z: [M+H]+ Calcd for $C_8H_{15}N_2O_5$ 219.0975 found 219.1006.

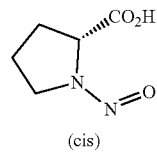
(cis) 10

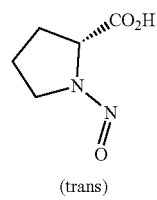
(trans) 10 nitroso-D-proline (10). General procedure A was employed using D-Proline (23 mg, 0.2 mmol) in dichlorethane. The reaction afforded 10 (trans) and 10 (cis) as a mixture of rotamers (28.2 mg, 98% yield) as a pale yellow oil separated by silica gel (10% MeOH in DCM).

1H NMR (500 MHZ, CDCl$_3$): 5.26 (dd, J=8.6, 3.2 Hz, 1H), 4.49-4.38 (m, 3H), 4.31 (dt, J=11.7, 6.6 Hz, 2H), 3.64-3.55 (m, 2H), 2.47-2.32 (m, 3H), 2.32-2.25 (m, 1H), 2.21-2.13 (m, 1H), 2.12-1.99 (m, 3H).

13C NMR (125 MHz, CDCl3): 243.0, 240.7, 132.9, 129.0, 120.9, 116.5, 99.5, 98.5, 93.8, 91.8.

HRMS (ESI-TOF) m/z: [M+H]+ Calcd for $C_5H_9N_2O_3$ 145.0608 found 145.0601.

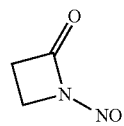
11

1-nitrosoazetidin-2-one (11). General procedure A was employed using 2-Azetidinone (16 mg, 0.2 mmol) in dicheloethane. The reaction afforded 11 (18.2 mg, 91% yield) as a yellow oil separated by silica gel (5-10% MeOH in DCM).

1H NMR (400 MHz, CDCl3): 3.65 (t, J=5.9 Hz, 2H), 3.18 (t, J=5.9 Hz, 2H).

13C NMR (100 MHz, CDCl3): 160.8, 40.7, 33.9.

HRMS (ESI-TOF) m/z: [M+H]+ Calcd for $C_3H_5N_2O_2$ 101.0346 found 101.0585.

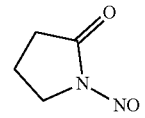
12

1-nitrosopyrrolidin-2-one (12). General procedure A was employed using 2-Pyrrolidinone (16 μL, 0.2 mmol) in dichloroethane. The reaction afforded 12 (21.4 mg, 94% yield) as a pale yellow oil separated by silica gel (5-10% MeOH in DCM).

1H NMR (500 MHz, CDCl3): 3.73-3.63 (m, 2H), 2.79 (t, J=8.1 Hz, 2H), 2.25-2.09 (m, 2H).

13C NMR (125 MHz, CDCl3): 173.1, 42.7, 31.0, 15.9.

HRMS (ESI-TOF) m/z: [M+H]+ Calcd for $C_4H_7N_2O_2$ 115.0502 found 115.0499.

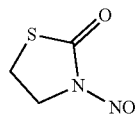

13

3-nitrosothiazolidin-2-one (13). General procedure B was employed using 1,3-thiazolidin-2-one (21 mg, 0.2 mmol). The reaction afforded 13 (20.6 mg, 78% yield) as a pale yellow oil separated by silica gel (5-10% MeOH in DCM).

1H NMR (500 MHz, CDCl3): 4.00 (t, J=7.3 Hz, 1H), 3.39 (t, J=7.3 Hz, 1H).

13C NMR (125 MHz, CDCl3): 171.1, 43.0, 23.8.

HRMS (ESI-TOF) m/z: [M+H]+ Calcd for $C_{10}H_{12}NO_4$ 133.0066 found 133.0075.

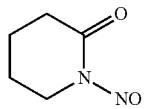

14

1-nitrosopiperidin-2-one (14). General procedure A was employed using δ-valerolactam (21 mg, 0.2 mmol) in dichloroethane. The reaction afforded 14 (23.8 mg, 93% yield) as a pale yellow oil separated by silica gel (5-10% MeOH in DCM).

1H NMR (500 MHz, CDCl3): 3.60-3.47 (m, 1H), 2.86-2.74 (m, 1H), 1.92-1.81 (m, 2H).

13C NMR (125 MHz, CDCl3): 170.2, 43.6, 34.0, 21.4, 20.1.

HRMS (ESI-TOF) m/z: [M+H]+ Calcd for $C_5H_9N_2O_2$ 129.0659 found 129.0655.

Scheme 2 Compounds (15-36)

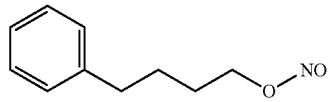

15

4-phenylbutyl nitrite (15). General procedure A was employed using 4-Phenyl-1-butanol (31 μL, 0.2 mmol) in dichloroethane. The reaction afforded 15 (28.6 mg, 80% yield) as a pale yellow oil separated by silica gel (3-5% ethyl acetate in hexanes). When general procedure B was employed (30.8 mg, 86% yield).

1H NMR (500 MHZ, CDCl3): 7.31 (t, J=7.3 Hz, 2H), 7.25-7.15 (m, 3H), 4.73 (s, 2H), 2.68 (t, J=7.3 Hz, 2H), 1.84-1.69 (m, 4H).

13C NMR (125 MHz, CDCl3): δ 141.9, 128.5, 128.5, 126.0, 68.3, 35.5, 28.7, 27.8.

HRMS (ESI-TOF) m/z: [M+H]+ Calcd for $C_{10}H_{14}NO_2$ 180.1019 found 180.1034.

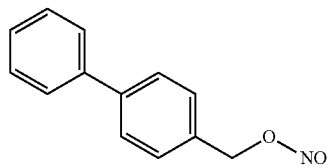

16

[1,1'-biphenyl]-4-ylmethyl nitrite (16). General procedure A was employed using Biphenyl-4-methanol (37 mg, 0.2 mmol) in dichloroethane. The reaction afforded 16 (41.8 mg, 98% yield) as a colorless solid separated by silica gel (3-5% ethyl acetate in hexanes). When general procedure B was employed (30.9 mg, 98% yield).

1H NMR (400 MHZ, CDCl3): 7.61 (t, J=7.4 Hz, 4H), 7.41 (qd, J=14.9, 7.3 Hz, 5H), 5.76 (s, 2H).

13C NMR (100 MHz, CDCl3): 141.5, 140.5, 134.5, 128.8, 128.6, 127.6, 127.5, 127.1, 69.7.

HRMS (ESI-TOF) m/z: [M+H]+ Calcd for $C_{13}H_{12}NO_2$ 214.0863 found 214.0851.

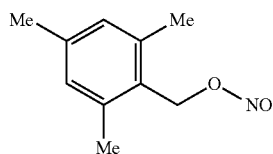

17

2,4,6-trimethylbenzyl nitrite (17). General procedure A was employed using 2,4,6-Trimethylbenzyl alcohol (30 mg, 0.2 mmol) in dichloroethane. The reaction afforded 17 (34.8 mg, 97% yield) as a colorless solid separated by silica gel (3-5% ethyl acetate in hexanes). When general procedure B was employed (34.6 mg, 98% yield). The data matches those previously reported.

1H NMR (400 MHZ, CDCl3): 6.91 (s, 2H), 5.72 (s, 2H), 2.34 (s, 6H), 2.30 (s, 3H).

13C NMR (100 MHz, CDCl3): 138.9, 138.2, 129.3, 128.4, 64.8, 21.2, 19.7.

HRMS (ESI-TOF) m/z: [M+H]+ Calcd for $C_{10}H_{14}NO_2$ 180.1019 found 180.1008.

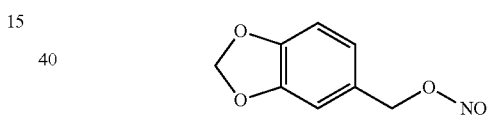

18 benzo[d][1,3]dioxol-5-ylmethyl nitrite (18). General procedure A was employed using Piperonyl alcohol (31 mg, 0.2 mmol) in dichloroethane. The reaction afforded 18 (29.2 mg, 81% yield) as a colorless oil separated by silica gel (10% ethyl acetate in hexanes). When general procedure B was employed (34.3 mg, 95% yield).

1H NMR (500 MHZ, CDCl3): 6.86-6.73 (m, J=7.7 Hz, 3H), 5.97 (s, 2H), 5.61 (s, 2H).

13C NMR (125 MHz, CDCl3): 148.1, 148.0, 129.4, 122.3, 109.0, 108.5, 101.4, 70.2.

HRMS (ESI-TOF) m/z: [M+H]+ Calcd for $C_8H_8NO_4$ 182.0448 found 182.0415

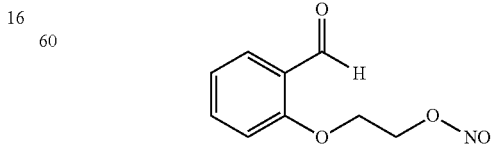

19

2-(2-formylphenoxy)ethyl nitrite (19). General procedure A was employed using 2-(2-Hydroxyethoxy)benzaldehyde (23 µL, 0.2 mmol) in acetonitrile. The reaction afforded 19 (28.7 mg, 74% yield) as a yellow oil separated by silica gel (3-5% ethyl acetate in hexanes). When general procedure B was employed (33.1 mg, 85% yield).

1H NMR (400 MHz, CDCl3): 10.42 (s, 1H), 7.84 (dd, J=7.6, 1.5 Hz, 1H), 7.59-7.52 (m, 1H), 7.06 (t, J=7.5 Hz, 1H), 6.97 (d, J=8.4 Hz, 1H), 5.20 (s, 2H), 4.44-4.32 (m, 2H).

13C NMR (100 MHz, CDCl3): 189.6, 160.7, 136.1, 128.7, 125.2, 121.6, 112.5, 66.8, 66.3.

HRMS (ESI-TOF) m/z: [M+H]+ Calcd for $C_9H_{10}NO_4$ 196.0604 found 196.0581.

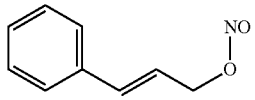

20 cinnamyl nitrite (20). General procedure A was employed using Cinnamyl alcohol (27 µL, 0.2 mmol) in dichloroethane. The reaction afforded 20 (11.7 mg, 36% yield) as a colorless oil separated by silica gel (3-5% ethyl acetate in hexanes). When general procedure B was employed (27.5 mg, 84% yield).

1H NMR (500 MHz, CDCl3): 7.40 (t, J=9.3 Hz, 2H), 7.34 (dd, J=16.5, 8.9 Hz, 2H), 7.31-7.26 (m, 1H), 6.69 (d, J=15.9 Hz, 1H), 6.32 (dt, J=15.7, 6.3 Hz, 1H), 5.35 (s, 2H).

13C NMR (125 MHz, CDCl3): 136.1, 134.9, 128.8, 128.4, 126.8, 122.8, 68.7.

HRMS (ESI-TOF) m/z: [M+H]+ Calcd for $C_9H_{10}NO_2$ 164.0706 found 164.0698.

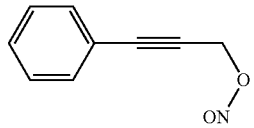

21

3-phenylprop-2-yn-1-yl nitrite (21). General procedure A was employed using 3-Phenyl-2-propyn-1-ol (27 µL, 0.2 mmol) in acetonitrile. The reaction afforded 21 (17.3 mg, 54% yield) as a colorless oil separated by silica gel (10% ethyl acetate in hexanes). When general procedure B was employed (19.8 mg, 62% yield).

1H NMR (500 MHz, CDCl3): 7.47-7.44 (m, 2H), 7.36-7.30 (m, 3H), 5.49 (s, 2H).

13C NMR (125 MHz, CDCl3): 132.0, 131.8, 129.0, 128.5, 122.1, 87.0, 51.9.

HRMS (ESI-TOF) m/z: [M+H]+ Calcd for $C_9H_8NO_2$ 162.0550 found 162.0548

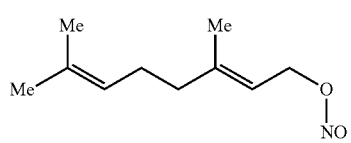

22

(E)-3,7-dimethylocta-2,6-dien-1-yl nitrite (22). General procedure A was employed using Geraniol (35 µL, 0.2 mmol) in dichloroethane. The reaction afforded 22 (32.1 mg, 88% yield) as a pale yellow oil separated by silica gel (3-5% ethyl acetate in hexanes). When general procedure B was employed (32.1 mg, 85% yield).

1H NMR (500 MHz, CDCl3): 5.37 (t, J=6.5 Hz, 1H), 5.21-5.02 (m, J=22.4, 16.7 Hz, 3), 2.17-1.99 (m, 4H), 1.74 (s, 3H), 1.68 (s, 3H), 1.60 (s, 3H).

13C NMR (125 MHz, CDCl3): 143.5, 132.1, 123.7, 117.6, 64.9, 39.7, 26.4, 25.8, 17.8, 16.7.

HRMS (ESI-TOF) m/z: [M+H]+ Calcd for $C_{10}H_{24}NO_3Si$ 184.1338 found 184.1322.

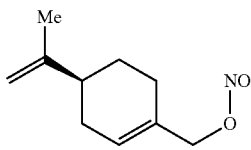

23

(S)-(4-(prop-1-en-2-yl)cyclohex-1-en-1-yl)methyl nitrite (23). General procedure A was employed using(S)-(−)-Perillyl alcohol (38 µL, 0.2 mmol) in dichloroethane. The reaction afforded 23 (30.2 mg, 84% yield) as a pale yellow oil separated by silica gel (3-5% ethyl acetate in hexanes). When general procedure B was employed (18.7 mg, 52% yield).

1H NMR (400 MHZ, CDCl3): 5.80 (s, 1H), 5.08 (s, 2H), 4.72 (d, J=9.1 Hz, 2H), 2.21-1.95 (m, 4H), 1.90-1.81 (m, 1H), 1.74 (s, 3H), 1.55-1.44 (m, 1H).

13C NMR (100 MHz, CDCl3): 149.6, 132.5, 127.1, 109.0, 72.7, 40.9, 30.6, 27.4, 26.6, 20.9.

HRMS (ESI-TOF) m/z: [M+H]+ Calcd for $C_{10}H_{16}NO_2$ 182.1176 found 182.1161.

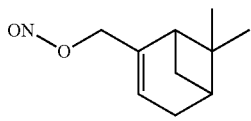

24

(6,6-dimethylbicyclo[3.1.1]hept-2-en-2-yl)methyl nitrite (24). General procedure A was employed using Myrtenol (38 µL, 0.2 mmol) in acetonitrile. The reaction afforded 24 (33.3 mg, 92% yield) as a pale yellow oil separated by silica gel (3-5% ethyl acetate in hexanes). When general procedure B was employed (34.3 mg, 95% yield).

1H NMR (500 MHZ, CDCl3): 5.60 (s, 1H), 5.05 (s, 2H), 2.41 (dt, J=8.7, 5.6 Hz, 1H), 2.29 (q, J=18.1 Hz, 2H), 2.11 (d, J=5.2 Hz, 2H), 1.28 (s, 3H), 1.18 (d, J=8.7 Hz, 1H), 0.81 (s, 3H).

13C NMR (125 MHz, CDCl3): 142.9, 122.8, 71.3, 43.7, 40.8, 38.3, 31.6, 31.5, 26.2, 21.2.

HRMS (ESI-TOF) m/z: [M+H]+ Calcd for $C_{10}H_{16}NO_2$ 182.1171 found 182.1168.

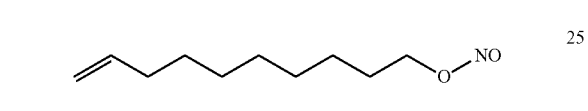

25 dec-9-en-1-yl nitrite (25). General procedure A was employed using 9-Decen-1-ol (36 µL, 0.2 mmol) in acetonitrile. The reaction afforded 25 (33.9 mg, 92% yield) as a pale yellow oil separated by silica gel (3-5% ethyl acetate in hexanes). When general procedure B was employed (35.5 mg, 96% yield).

1H NMR (500 MHZ, CDCl3): 5.81 (ddt, J=16.9, 10.1, 6.7 Hz, 1H), 4.99 (d, J=17.1 Hz, 1H), 4.93 (d, J=10.1 Hz, 1H), 4.69 (s, 2H), 2.04 (dd, J=14.0, 6.9 Hz, 2H), 1.79-1.65 (m, 2H), 1.42-1.22 (m, 10H).

13C NMR (125 MHz, CDCl3): 139.3, 114.3, 114.3, 68.6, 33.9, 29.5, 29.3, 29.1, 29.0, 26.0.

HRMS (ESI-TOF) m/z: [M+H]+ Calcd for $C_{10}H_{20}NO_2$ 186.1494 found 186.1977.

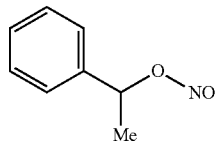

26

1-phenylethyl nitrite (26). General procedure A was employed using 1-Phenylethanol (25 μL, 0.2 mmol) in dichloroethane. The reaction afforded 26 (19.8 mg, 66% yield) as a pale yellow oil separated by silica gel (3-5% ethyl acetate in hexanes). When general procedure B was employed (20.8 mg, 69% yield).

1H NMR (500 MHZ, CDCl3): 7.46-7.28 (m, 5H), 6.52-6.38 (m, 1H), 1.72 (d, J=6.7 Hz, 3H).

13C NMR (125 MHz, CDCl3): 141.3, 128.7, 128.1, 126.2, 77.2, 22.2.

HRMS (ESI-TOF) m/z: [M+H]+ Calcd for $C_8H_{10}NO_2$ 152.0712 found 152.0699.

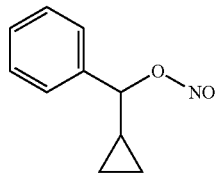

27 cyclopropyl (phenyl)methyl nitrite (27). General procedure A was employed using a-Cyclopropylbenzyl alcohol (29 μL, 0.2 mmol) in dichloroethane. The reaction afforded 27 (16.9 mg, 48% yield) as a pale yellow oil separated by silica gel (3-5% ethyl acetate in hexanes). When general procedure B was employed (13.7 mg, 39% yield).

1H NMR (400 MHZ, CDCl3): 7.47-7.28 (m, 5H), 5.68 (d, J=8.8 Hz, 1H), 1.54-1.41 (m, 1H), 0.75-0.68 (m, 2H), 0.52 (dt, J=14.1, 9.2 Hz, 2H).

13C NMR (100 MHz, CDCl3): 140.0, 128.7, 128.3, 126.8, 85.7, 16.7, 4.5, 3.9.

HRMS (ESI-TOF) m/z: [M+H]+ Calcd for $C_{10}H_{12}NO_2$ 178.0863 found 178.0852.

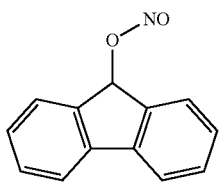

28

9H-fluoren-9-yl nitrite (28). General procedure A was employed using 9-Hydroxyfluorene (36 mg, 0.2 mmol) in dichloroethane. The reaction afforded 28 (28.8 mg, 68% yield) as a colorless solid separated by silica gel (3-5% ethyl acetate in hexanes). When general procedure B was employed (25.5 mg, 60% yield).

1H NMR (500 MHz, CDCl3): 7.71 (d, J=7.5 Hz, 2H), 7.48-7.42 (m, 4H), 7.32 (t, J=7.4 Hz, 2H), 7.27 (s, 1H).

13C NMR (125 MHz, CDCl3): 141.7, 141.0, 129.9, 128.1, 125.7, 120.4, 80.3.

HRMS (ESI-TOF) m/z: [M+H]+ Calcd for $C_{13}H_{10}NO_2$ [M+H]+ 212.0712 found 212.0731.

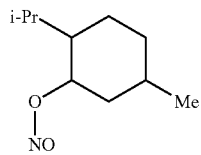

29

2-isopropyl-5-methylcyclohexyl nitrite (29). General procedure A was employed using (+)-menthol (31 mg, 0.2 mmol) in dichloroethane. The reaction afforded 29 (29.6 mg, 80% yield) as a pale yellow oil separated by silica gel (3-5% ethyl acetate in hexanes). When general procedure B was employed (35.5 mg, 96% yield). The data matches those previously reported.

1H NMR (400 MHZ, CDCl3): 5.37-5.14 (m, 1H), 2.09-1.95 (m, 1H), 1.88-1.70 (m, 3H), 1.69-1.53 (m, 1H), 1.53-1.41 (m, 1H), 1.29-1.11 (m, 2H), 1.04-0.83 (m, 7H), 0.77 (d, J=6.9 Hz, 3H).

13C NMR (100 MHz, CDCl3): 80.1, 46.7, 42.2, 34.2, 31.9, 25.9, 23.6, 22.2, 20.9, 15.9.

HRMS (ESI-TOF) m/z: [M+H]+ Calcd for $C_{10}H_{20}NO_2$ 186.1489 found 186.1484.

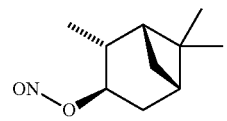

30

(1R,2R,3R,5S)-2,6,6-trimethylbicyclo[3.1.1]heptan-3-yl nitrite (30). General procedure A was employed using (1R,2R,3R,5S)-3-Pinanol (31 mg, 0.2 mmol) in dichloroethane. The reaction afforded 30 (28.4 mg, 78% yield) as a pale yellow oil separated by silica gel (3-5% ethyl acetate in hexanes). When general procedure B was employed (33.2 mg, 91% yield).

1H NMR (500 MHz, CDCl3): 5.69 (s, 1H), 2.71-2.57 (m, 1H), 2.46-2.36 (m, 1H), 2.22-2.12 (m, 1H), 2.04-1.95 (m, 1H), 1.93-1.88 (m, 1H), 1.88-1.81 (m, 1H), 1.27 (s, 3H), 1.14 (d, J=7.4 Hz, 3H), 1.08-1.01 (m, 3H).

13C NMR (125 MHz, CDCl3): 79.3, 47.5, 43.8, 41.4, 38.7, 35.9, 33.9, 27.6, 24.0, 20.1.

HRMS (ESI-TOF) m/z: [M+H]+ Calcd for $C_{10}H_{18}NO_2$ 184.1332 found 184.1326.

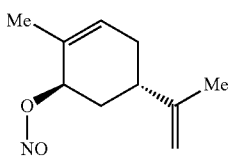

(trans)

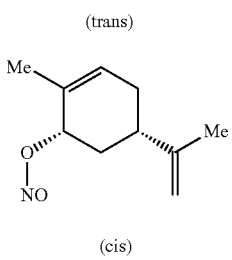

(cis)

(1R,5S)-2-methyl-5-(prop-1-en-2-yl)cyclohex-2-en-1-yl nitrite (31 trans) and (1S,5S)-2-methyl-5-(prop-1-en-2-yl)cyclohex-2-en-1-yl nitrite (31 cis). General procedure A was employed using (−)-carveol (32 μL, 0.2 mmol) in dichloroethane. The reaction afforded 31 (trans) and 31 (cis) as a mixture of rotamers in a 1:1.25 (trans:cis) ratio (27.1 mg, 75% yield) as a pale yellow oil separated by silica gel (5-10% ethyl acetate in hexanes). When general procedure B was employed (33.0 mg, 91% yield).
(31 Trans) and (31 Cis)

1H NMR (500 MHz, CDCl3): 6.06-5.95 (m, 1H), 5.83-5.79 (m, 1H), 5.77 (s, 1H), 5.73-5.65 (m, 1H), 4.78-4.69 (m, 4H), 2.52-2.41 (m, 1H), 2.35-2.11 (m, 5H), 2.06-1.99 (m, 2H), 1.95-1.88 (m, 2H), 1.79-1.67 (m, 11H), 1.61 (s, 3H).

13C NMR (125 MHz, CDCl3): 148.7, 148.2, 132.4, 123.0, 128.9, 127.0, 109.7, 109.5, 40.8, 35.7, 35.2, 35.0, 30.9, 30.9, 21.0, 20.6, 20.6, 19.3.

HRMS (ESI-TOF) m/z: [M+H]+ Calcd for $C_{10}H_{16}NO_2$ 182.1176 found 182.1167.

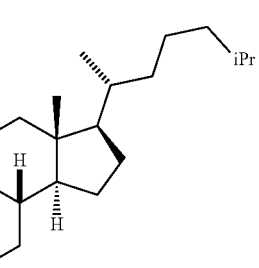

(3S,8S,9S,10R,13R,14S,17R)-10,13-dimethyl-17-((R)-6-methylheptan-2-yl)-2,3,4,7,8,9,10,11,12,13,14,15,16,17-tetradecahydro-1H-cyclopenta[a]phenanthren-3-yl nitrite (32). General procedure A was employed using 3B-Hydroxy-5-cholestene (83 mg, 0.2 mmol) in acetonitrile. The reaction afforded 32 (69.0 mg, 83% yield) as a white solid separated by silica gel (20% ethyl acetate in hexanes). When general procedure B was employed (70.6 mg, 85% yield).

1H NMR (500 MHz, CDCl3): 5.49-5.42 (m, 1H), 5.29-5.19 (m, 1H), 2.52 (t, J=11.6 Hz, 1H), 2.41 (dd, J=13.1, 3.3 Hz, 1H), 2.09-1.92 (m, 4H), 1.90-1.68 (m, 3H), 1.65-1.45 (m, 6H), 1.43-1.24 (m, 6H), 1.23-0.98 (m, 12H), 0.93 (d, J=6.5 Hz, 3H), 0.88 (dd, J=6.5, 1.9 Hz, 6H), 0.70 (s, 3H).

13C NMR (125 MHz, CDCl3): 139.6, 123.2, 79.6, 56.9, 56.3, 50.3, 42.5, 39.9, 39.7, 38.9, 37.3, 36.8, 36.4, 36.0, 32.1, 32.0, 28.5, 28.4, 28.2, 24.5, 24.0, 23.0, 22.7, 21.2, 19.5, 18.9, 12.0.

HRMS (ESI-TOF) m/z: [M+H]+ Calcd for $C_{27}H_{48}NO_2$ 416.3523 found 416.3560.

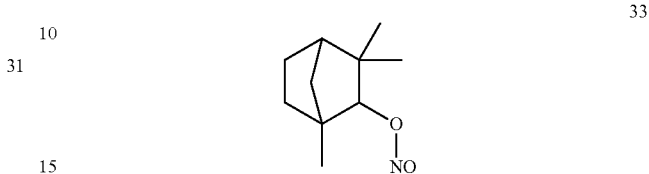

1,3,3-trimethylbicyclo[2.2.1]heptan-2-yl nitrite (33). General procedure B was employed using Fenchyl alcohol (32 mg, 0.2 mmol). The reaction afforded 33 (19.4 mg, 53% yield) as a pale yellow oil separated by silica gel (3-5% ethyl acetate in hexanes).

1H NMR (500 MHz, CDCl3): 4.93 (s, 1H), 1.81 (d, J=3.0 Hz, 1H), 1.70 (d, J=10.8 Hz, 2H), 1.65-1.57 (m, 1H), 1.53-1.44 (m, 1H), 1.29 (d, J=10.6 Hz, 1H), 1.13 (s, 3H), 1.06 (s, 3H), 0.73 (s, 3H).

13C NMR (125 MHz, CDCl3): 91.3, 48.7, 48.3, 41.8, 40.3, 30.3, 26.7, 26.0, 21.2, 19.2.

HRMS (ESI-TOF) m/z: [M+H]+ Calcd for $C_{10}H_{18}NO_2$ 184.1332 found 184.1326.

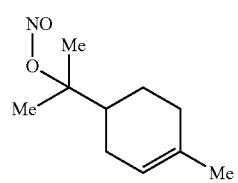

(R)-2-(4-methylcyclohex-3-en-1-yl) propan-2-yl nitrite (34). General procedure B was employed using a-Terpineol (33 μL, 0.2 mmol). The reaction afforded 34 (23.0 mg, 63% yield) as a teal oil separated by silica gel (3-5% ethyl acetate in hexanes). *34 consistently appeared to decompose into an unknown compound during characterization. Tabulated data reflects desired product.

1H NMR (500 MHz, CDCl3): 5.39 (s, 1), 2.10-1.75 (m, 5H), 1.66 (s, 3H), 1.57 (d, J=5.9 Hz, 6H).

13C NMR (125 MHz, CDCl3): 134.3, 120.2, 87.2, 44.0, 30.9, 26.7, 25.4, 24.4, 24.0, 23.4.

HRMS (ESI-TOF) m/z: [M+H]+ Calcd for $C_{10}H_{18}NO_2$ 184.1332 found 184.1317.

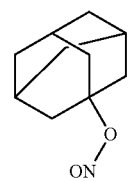

adamantan-1-yl nitrite (35). General procedure A was employed using 1-Adamantanol (31 mg, 0.2 mmol) in acetonitrile. The reaction afforded 35 (19.2 mg, 53% yield)

as a colorless solid separated by silica gel (3-5% ethyl acetate in hexanes). When general procedure B was employed (22.8 mg, 63% yield).

1H NMR (500 MHZ, CDCl3): 2.29 (s, 3H), 2.13 (s, 6H), 1.76 (s, 6H).

13C NMR (125 MHz, CDCl3): 82.3, 42.9, 36.2, 30.9.

HRMS (ESI-TOF) m/z: [M+H]+ Calcd for $C_{10}H_{16}NO_2$ 182.1176 found 182.1168.

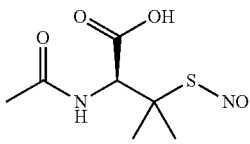

36

S-nitroso-N-acetylpenicillamine (36). General procedure B was employed using N-Acetyl-D-penicillamine (38 mg, 0.2 mmol). The reaction afforded 36 (31.7 mg, 72% yield) as a blue solid separated by silica gel (100% ethyl acetate). The data matches those previously reported.

1H NMR (500 MHZ, (CD3)2SO): 13.17 (bs, 1H), 8.51 (d, J=9.5 Hz, 1H), 5.17 (d, J=9.5 Hz, 1H), 3.39 (bs, 1H), 1.97 (s, 3H), 1.94 (s, 3H), 1.87 (s, 3H).

13C NMR (125 MHz, (CD3)2SO): 170.9, 169.6, 59.2, 58.4, 26.3, 25.3, 22.2.

HRMS (ESI-TOF) m/z: [M+H]+ Calcd for $C_7H_{13}N_2O_4S$ 221.0591 found 221.0585.

Procedure for Synthesis of $^{15}$N-Labeled NO-1.

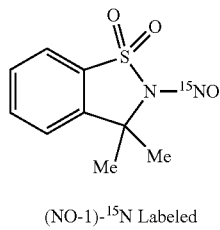

(NO-1)-$^{15}$N Labeled 3,3-dimethyl-2-[nitroso-15N]-2,3-dihydrobenzo[d]isothiazole 1,1-dioxide (NO-1). To a large 1 L round bottom 986.3 mg (5 mmol) of DMBS was added with 10 mL of DCM and 1.3 g (7.0 mmol) of pTsOH. The mixture was stirred and cooled to 0° C. Slowly added was 500.0 mg (7.14 mmol) NaNO2. The reaction was left to warm to room temperature and stirred overnight. The was filtered through a Buchner funnel to remove the insoluble material. The filtrate was then absorbed onto silica and purified with column chromatography using DCM (Rf=0.4) or 10% EtOAc in hexanes as the mobile phase. Isolated was 886.2 mg (78% yield) of greenish yellow solid.

1H NMR (500 MHz, CDCl3): 7.89-7.77 (m, 2H), 7.64 (t, J=7.6 Hz, 1H), 7.53 (d, J=7.9 Hz, 1H), 2.00 (s, 6H).

13C NMR (125 MHz, CDCl3): 139.6, 135.4, 131.6, 130.3, 123.4, 122.3, 65.5, 29.8.

HRMS (ESI-TOF) m/z: [M+H]+ Calcd for $C_9H_{11}N^{15}NO_3S$ 228.0455 found 228.0446.

Scheme 3 Compounds (37-39)

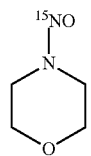

37

4-nitrosomorpholine (37). General procedure A was employed using morpholine (17 mg, 0.2 mmol) in dichloromethane. The reaction afforded 37 (22.9 mg, 98% yield) as a pale yellow oil separated by silica gel (30% ethyl acetate in hexanes).

1H NMR (500 MHZ, CDCl3): 4.32-4.24 (m, 1H), 3.90-3.86 (m, 1H), 3.86-3.82 (m, 1H), 3.68-3.61 (m, 1H).

13C NMR (125 MHz, CDCl3): 67.4 (s), 66.0 (s), 50.0 (d, J=6.0 Hz), 40.4 (d, J=1.8 Hz).

HRMS (ESI-TOF) m/z: [M+H]+ Calcd for $C_4H_9N^{15}NO_2$ 118.0629 found 118.0631.

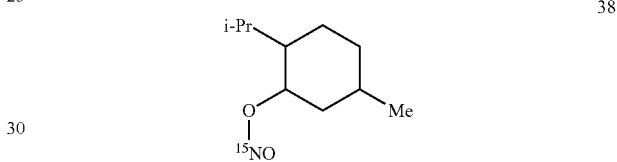

38

15N-labeled 2-isopropyl-5-methylcyclohexyl nitrite (38). General procedure A was employed using (±)-menthol (31 mg, 0.2 mmol) in dichloroethane. The reaction afforded 38 (29.8 mg, 81% yield) as a pale yellow oil separated by silica gel (3-5% ethyl acetate in hexanes).

1H NMR (500 MHZ, CDCl3): 5.36-5.16 (m, 1H), 2.02 (d, J=11.6 Hz, 1H), 1.90-1.69 (m, 3H), 1.69-1.54 (m, 1H), 1.48 (t, J=11.6 Hz, 1H), 1.28-1.14 (m, 2H), 1.02-0.84 (m, 7H), 0.77 (d, J=6.8 Hz, 3H).

13C NMR (125 MHz, CDCl3): 80.1, 46.7, 42.2, 34.2, 31.9, 25.9, 23.6, 22.2, 20.9, 15.9.

HRMS (ESI-TOF) m/z: [M+H]+ Calcd for $C_{10}H_{20}{}^{15}NO_2$ 187.1459 found 187.1451.

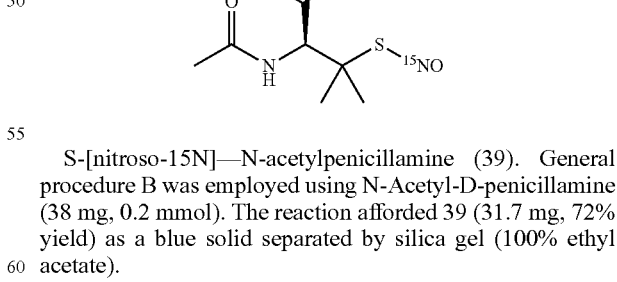

39

S-[nitroso-15N]—N-acetylpenicillamine (39). General procedure B was employed using N-Acetyl-D-penicillamine (38 mg, 0.2 mmol). The reaction afforded 39 (31.7 mg, 72% yield) as a blue solid separated by silica gel (100% ethyl acetate).

1H NMR (500 MHZ, DMSO): 13.10 (s, 1H), 8.50 (d, J=9.5 Hz, 1H), 5.16 (d, J=9.5 Hz, 1H), 1.97 (s, 3H), 1.94 (s, 3H), 1.87 (s, 3H).

13C NMR (125 MHZ, DMSO): 170.8, 170.0, 59.1, 58.3, 26.2, 25.2, 22.2.

HRMS (ESI-TOF) m/z: [M+H]+ Calcd for $C_7H_{13}N^{15}NO_4S$ 222.0561 found 222.0563.

Discussion

Cyclic and acyclic amines were effectively nitrosated by NO-1 (Scheme 1, entries 1-5). Free alcohols were tolerated (6), although it is likely that transnitrosation initially occurred at oxygen prior to intramolecular transnitrosation to the amine. Carboxylic acids were well tolerated, allowing for the direct nitrosation of amino acids (entries 7-10). Finally, cyclic amides were efficiently nitrosated in high yields (entries 11-14). To the best of our knowledge nitroso compounds 9, 11, and 13 were reported here for the first time.

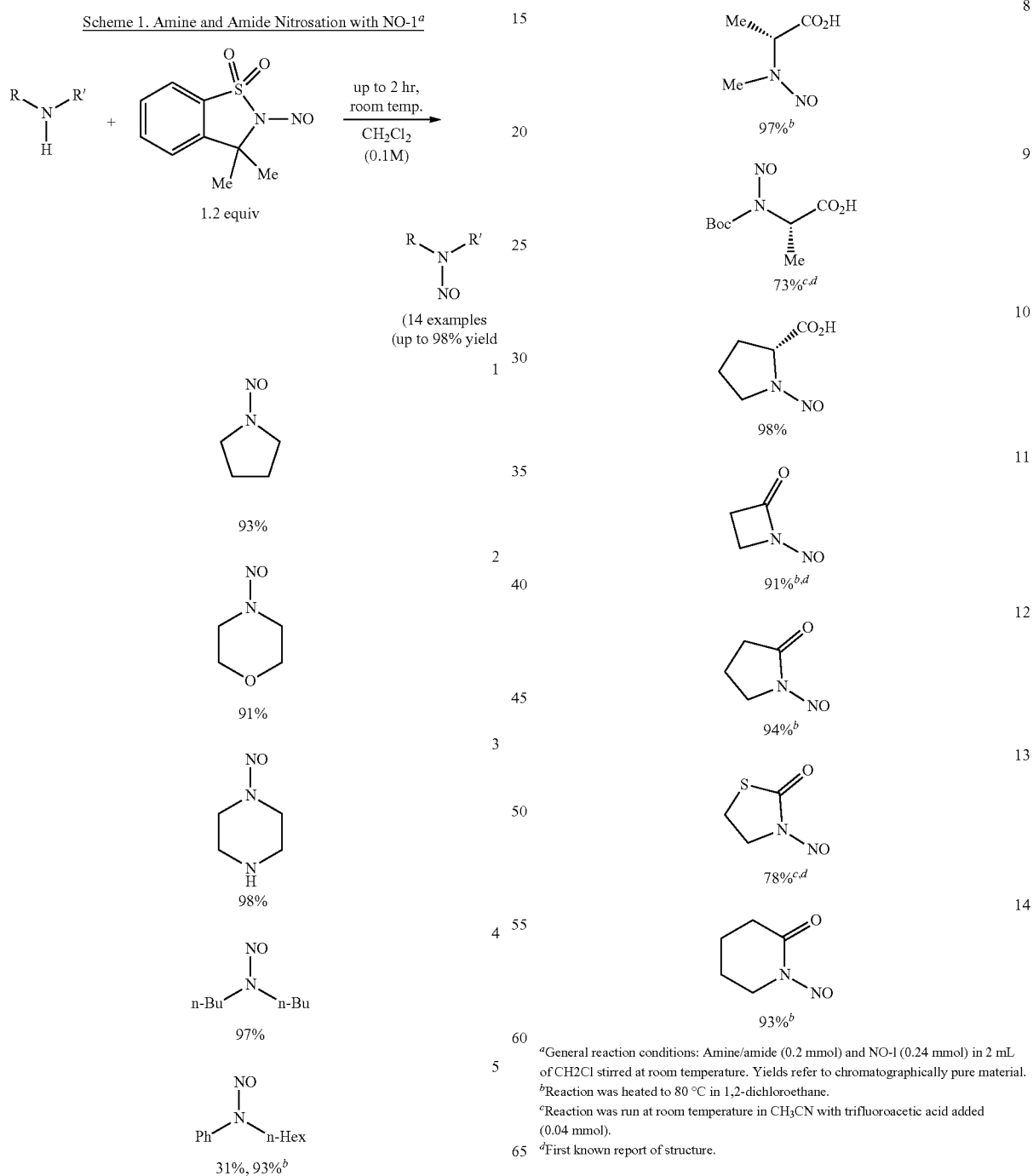

[a]General reaction conditions: Amine/amide (0.2 mmol) and NO-1 (0.24 mmol) in 2 mL of CH2Cl stirred at room temperature. Yields refer to chromatographically pure material.
[b]Reaction was heated to 80 °C in 1,2-dichloroethane.
[c]Reaction was run at room temperature in CH3CN with trifluoroacetic acid added (0.04 mmol).
[d]First known report of structure.

Scheme 2. Alcohol Nitrosation with NO-1[a]
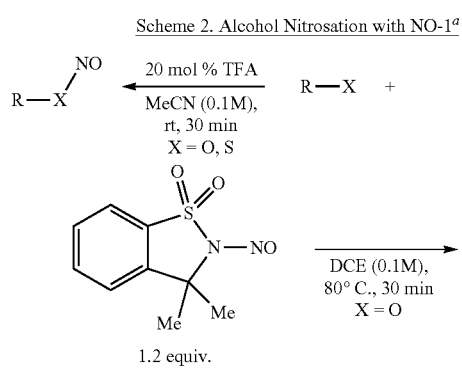
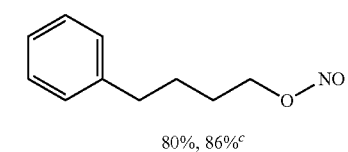
80%, 86%[c]
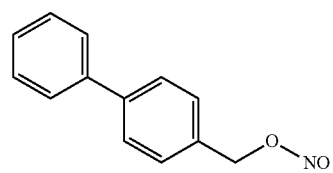
98%, 98%[c]
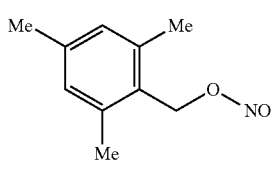
97%, 98%[c]
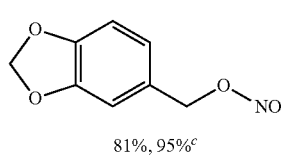
81%, 95%[c]
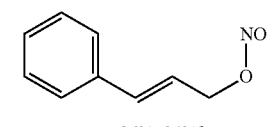
74%[b], 85%[c]
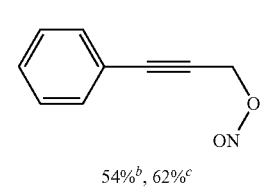
36%, 84%[c]
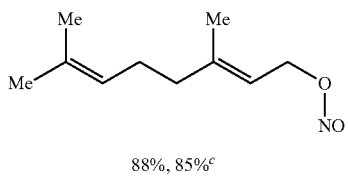
54%[b], 62%[c]
-continued
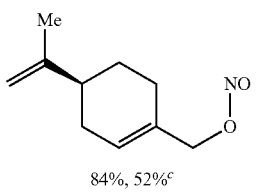
88%, 85%[c]
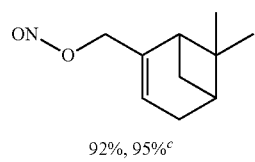
84%, 52%[c]
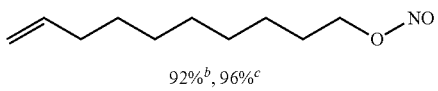
92%, 95%[c]
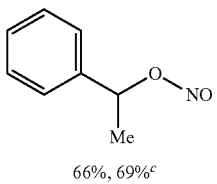
92%[b], 96%[c]
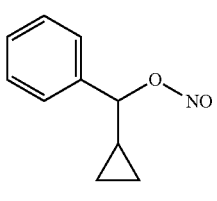
66%, 69%[c]
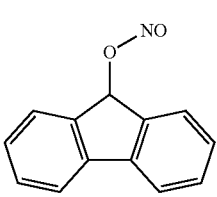
48%, 39%[c]
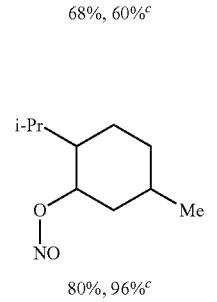
68%, 60%[c]
80%, 96%[c]

-continued

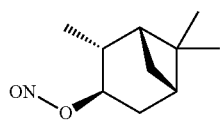

78%, 91%[c]

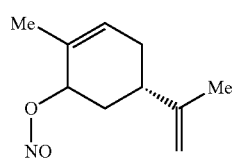

75%, 91%[c]

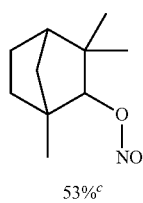

53%[c]

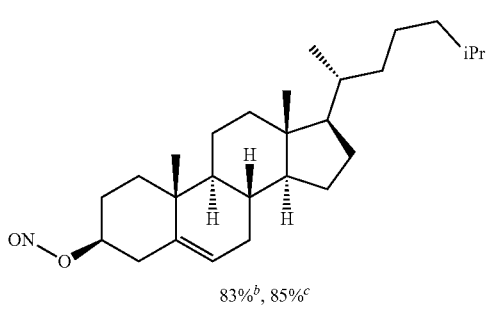

83%[b], 85%[c]

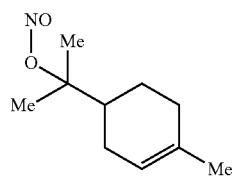

63%[c]

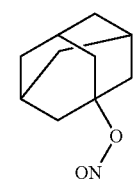

53%[b], 63%[c]

-continued

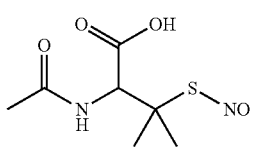

72%[c], 91%[c,d]

[a]General reaction conditions: Alcohol (0.2 mmol) and NO-1 (0.24 mmol) in 2 mL 1,2-dichcloroethane (DCE) stirred at 80 °C. for 30 min. Yields refer to chromatographically pure material.
[b]Reaction was run in CH$_3$CN 80 °C.
[c]Reaction was run at room temperature in CH$_3$CN will trifluoroacetic acid added (0.04 mmol).
[d]NMR yield using 1,2,4,5-tetramethylbenzene as a standard.

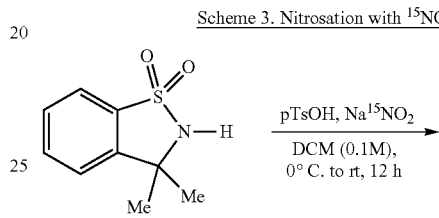

Scheme 3. Nitrosation with $^{15}$NO-1

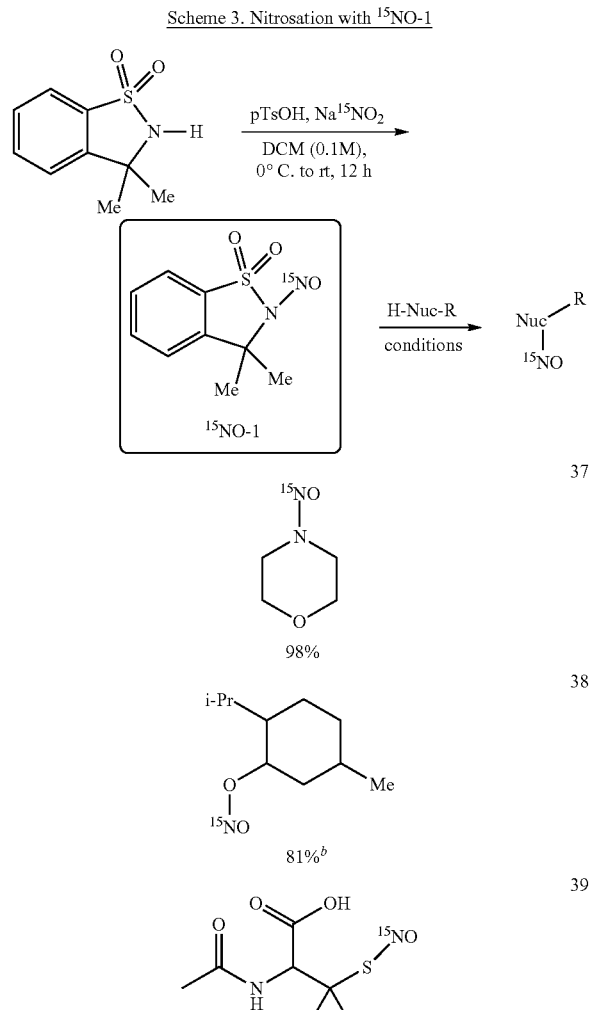

[a]Reaction conditions: Nucleophile (0.2 mmol) and $^{15}$NO-1 (0.24 mmol) in 2 mL of dichloromethane stirred at room temperature for 30 min.
[b]1,2-Dichloroethane (DCE) stirred at 80 °C. for 30 min.
[c]CH$_3$CN with trifluoroacetic acid (0.04 mmol) at room temperature for 30 min.
[d]NMR yield using 1,2,3,4,5-tetramethylbenzene as an internal standard.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112 (f) or 35 U.S.C. § 112 (6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112 (6) is not invoked.

Reagent NO-1 was effective for the synthesis of nitrosoamines and nitrosoamides. Many of the structures shown in Scheme 1 may be directly accessed by reaction with tert-butyl nitrate (TBN). Conversely, alkyl alcohols often require excess TBN to promote transnitrosation or suffer from unwanted oxidation under ambient conditions. Scheme 2 shows that NO-1 efficiently nitrosated a variety of alcohol structures. Primary (15-25), secondary (26-33), and tertiary (34 and 35) alcohols were all effectively nitrosated in good to excellent yields. Activated benzylic or allylic alcohols were not susceptible to oxidation, although no effort was made to exclude oxygen from solvents or reaction flasks. In addition, NO-1 tolerated elevated temperature in the presence of alkynes (21) and alkenes (20, 23-25, 31, 32, and 34) without evidence of byproducts resulting from homolytic N—N cleavage of NO-1.

N-Acetylpenicillamine was also successfully nitrosated to produce S-nitroso-N-acetylpenicillamine (36). For substrates that do not tolerate elevated temperatures, an alternative experimental procedure involving catalytic trifluoroacetic acid was generally effective. Isolated yields for both procedures are given for the majority of substrates shown in Scheme 2. In many cases, transnitrosation was effective in multiple organic solvents.

One of the strengths of the presently disclosed transnitrosation method is the ability to easily incorporate isotopically labeled 15NO into target molecules. Because enriched $Na^{15}NO_2$ is commercially available, we produced 15NO-1 to explore its efficacy in transnitrosation (Scheme 3). This reagent behaved analogously to NO-1 with no loss of stability or reactivity. A secondary amine (37), alcohol (38), and thiol (39) were all successfully nitrosated in high yields to produce enriched materials.

We have developed a new organic reagent that serves as an attractive alternative to TBN for the transnitrosation of nucleophiles under mild conditions. N-Nitrososulfonamide reagent, NO-1, was a an easily synthesized crystalline material that maintains long-term integrity under ambient storage conditions. Upon irreversible transnitrosation with a variety of nucleophiles, the sulfonamide byproduct of NO-1 was easily recovered to regenerate NO-1 with high fidelity. Alkyl alcohols, amines, amides, ureas, and thiols were all effectively irreversibly nitrosated by NO-1 under mild conditions, resulting in several nitroso compounds that were reported here for the first time.

The invention claimed is:
1. A compound of formula (I):

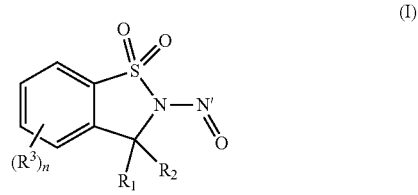

wherein:
n is 0 to 4,
N' is $^{14}N$ or $^{15}N$, and
$R^1$, $R^2$, and each $R^3$ are each independently selected from hydrogen, alkyl, substituted alkyl, alkenyl, substituted alkenyl, alkynyl, substituted alkynyl, cycloalkyl, substituted cycloalkyl, heterocycle, substituted heterocycle, aryl, substituted aryl, heteroaryl, substituted heteroaryl, halo, and hydroxyl.

2. The compound of claim 1, wherein n is 0.
3. The compound of claim 1, wherein n is 1 to 4.
4. The compound of claim 1, wherein $R^1$ and $R^2$ are each independently selected from H, alkyl, substituted alkyl, aryl, substituted aryl, heteroaryl, substituted heteroaryl, and halo.
5. The compound of claim 4, wherein at least one of $R^1$ and $R^2$ is a non-hydrogen group.
6. The compound of claim 4, wherein $R^1$ and $R^2$ are each independently selected from H, methyl, phenyl, fluoro, and trifluoromethyl.
7. The compound of claim 1, wherein $R^1$ and $R^2$ are the same group.
8. The compound of claim 7, wherein $R^1$ and $R^2$ are both H, both methyl, both phenyl, or both fluoro.
9. The compound of claim 1, wherein $R^1$ and $R^2$ are different groups.
10. The compound of claim 1, wherein N' is $^{14}N$.
11. The compound of claim 1, wherein N' is $^{15}N$.
12. A nitrosation method, comprising:
reacting a substrate with a nitrosation composition comprising a compound of claim 1 and thereby generating a nitrosation product.
13. The method of claim 12, wherein:
the substrate has the formula E-H or E$^-$,
E is selected from the group consisting of: —$SR^A$, —$OR^A$, —$NR^AR^B$, —$PR^AR^B$, —$CR^AR^BR^C$, and —$SiR^AR^BR^C$,
$R^A$, $R^B$, and $R^C$ are each independently selected from the group consisting of hydrogen, alkyl, substituted alkyl, alkenyl, substituted alkenyl, alkynyl, substituted alkynyl, cycloalkyl, substituted cycloalkyl, heterocycle, substituted heterocycle, aryl, substituted aryl, heteroaryl, and substituted heteroaryl, at least one of $R^A$, $R^B$, and $R^C$ is a non-hydrogen group, and the reacting generates a product of formula E-NO.

14. The method of claim 12, wherein the substrate has the formula E-H, the reacting generates a product of formula E-NO, wherein E has the formula (II):

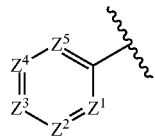

(II)

wherein:

$Z^1$, $Z^2$, $Z^3$, $Z^4$, and $Z^5$ are each independently selected from CR' and N, and each R' is independently selected from the group consisting of hydrogen, alkyl, substituted alkyl, alkenyl, substituted alkenyl, alkynyl, substituted alkynyl, cycloalkyl, substituted cycloalkyl, heterocycle, substituted heterocycle, aryl, substituted aryl, heteroaryl, substituted heteroaryl.

15. The method of claim 14, wherein $Z^1$, $Z^2$, $Z^3$, $Z^4$, and $Z^5$ are each CR'.

16. The method of claim 14, wherein each R' is independently selected from the group consisting of hydrogen, alkyl, substituted alkyl, aryl, substituted aryl, heteroaryl, substituted heteroaryl.

17. The method of claim 13, wherein E is —$SR^A$.
18. The method of claim 13, wherein E is —$OR^A$.
19. The method of claim 13, wherein E is —$NR^AR^B$.
20. A kit, comprising:

a composition comprising a compound of formula (I)

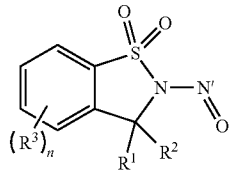

(I)

wherein:

n is 0 to 4,

N' is $^{14}N$ or $^{15}N$, and $R^1$, $R^2$, and each $R^3$ are each independently selected from hydrogen, alkyl, substituted alkyl, alkenyl, substituted alkenyl, alkynyl, substituted alkynyl, cycloalkyl, substituted cycloalkyl, heterocycle, substituted heterocycle, aryl, substituted aryl, heteroaryl, substituted heteroaryl, halo, and hydroxyl; and a container containing the composition.

* * * * *